US008249629B2

(12) United States Patent
Qu

(10) Patent No.: US 8,249,629 B2
(45) Date of Patent: Aug. 21, 2012

(54) PROVIDING TRANSPARENT CDMA SHORT MESSAGE SERVICE USING NON-CDMA MOBILE DEVICES, SMART CARDS AND NETWORKS

(75) Inventor: Hai Qu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1241 days.

(21) Appl. No.: 11/963,990

(22) Filed: Dec. 24, 2007

(65) Prior Publication Data

US 2009/0163230 A1 Jun. 25, 2009

(51) Int. Cl.
H04W 4/00 (2009.01)
(52) U.S. Cl. ........... 455/466; 455/412.1; 455/414.1; 370/328; 370/335; 370/347; 370/441; 370/442; 370/465; 370/466; 370/469
(58) Field of Classification Search .......... 455/412.1, 455/414.1, 466; 370/466, 328, 335, 347, 370/441, 442, 465, 469
See application file for complete search history.

(56) References Cited

U.S. PATENT DOCUMENTS

| 6,571,112 | B1 | 5/2003 | Ramaswamy |
| 7,072,359 | B2 * | 7/2006 | Uchida et al. ............ 370/466 |
| 7,110,747 | B2 * | 9/2006 | Jain et al. ............... 455/411 |
| 7,369,528 | B2 | 5/2008 | Tian |
| 7,397,773 | B2 | 7/2008 | Qu et al. |
| 2004/0132469 | A1 * | 7/2004 | Jun ..................... 455/466 |
| 2004/0203615 | A1 * | 10/2004 | Qu et al. ................ 455/412.1 |

FOREIGN PATENT DOCUMENTS

EP 1768427 3/2007

OTHER PUBLICATIONS

International Search Report and Written Opinion—PCT/US2008/088292, International Search Authority—European Patent Office—Apr. 27, 2009.
European Search Report—EP08102974—Search Authority—Munich—Apr. 20, 2009.

* cited by examiner

Primary Examiner — Amancio Gonzalez
(74) Attorney, Agent, or Firm — James T. Hagler

(57) ABSTRACT

Methods and systems for sending, receiving, storing, and reading CDMA type SMS messages on wireless non-CDMA or multimode mobile devices include embedding a CDMA SMS message in a non-CDMA SMS host message. Such a host message may be created, transmitted, received, or otherwise processed by a mobile device, such as one operating in a GSM or UMTS mode. Similarly a CDMA SMS message may be stored in a SIM/USIM module using similar techniques. An embodiment provides a software application programming interface (API) which transparently processes SMS messages regardless of whether they are CDMA or non-CDMA and regardless of the operating mode of the mobile device.

69 Claims, 13 Drawing Sheets

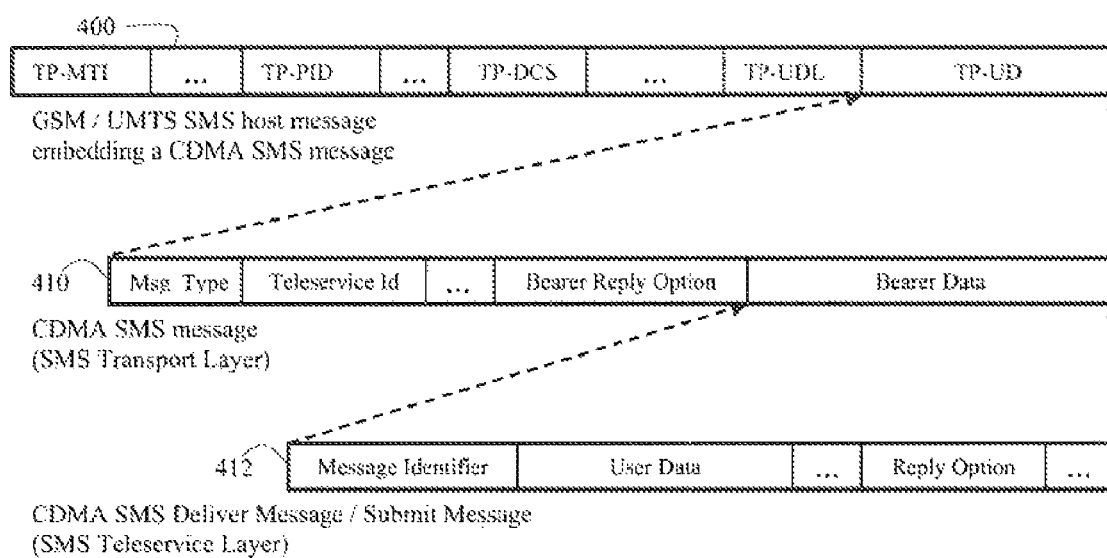

Fig. 3D

| SMS parameter | CDMA parameter name | GSM/UMTS parameter name |
|---|---|---|
| message type | Message Type | TP-MTI |
| protocol identifier | (no counterpart) | TP-PID |
| teleservice ID | Teleservice ID | (no counterpart) |
| destination address | Destination Address | TP-DA |
| originating address | Origination Address | TP-OA |
| recipient address | Destination Address | TP-RA |
| data coding scheme | Encoding *supports:*<br>- 7-bit<br>- 8-bit<br>- Octet<br>- Unicode<br>- ASCII<br>- IA5<br>- Shift JIS<br>- Korean<br>- Latin Hebrew | TP-DCS *supports:*<br>- 7-bit<br>- 8-bit<br>- Octet<br>- Unicode |
| failure cause | Cause Codes | TP-FCS |
| message reference | Message ID | TP-MR |
| validity period | Validity Period | TP-VP |
| parameter indicator | implied via TLV representation | TP-PI |
| reply path | User Ack Request in Reply Option | TP-RP |
| status report indication | Delivery Ack Request in Reply Option | TP-SRI<br>TP-SRR |
| message status | Message Status | TP-ST |
| time stamp | Time Stamp | TP-SCTS |
| user data header indicator | UDHI bit in Message ID | TP-UDHI |
| enhanced voice mail | Enhanced VMN | TP-UD Enhanced Voice Mail UDH |
| number of messages | Number of Messages | TP-UD special SM UDH |
| callback | Callback | TP-UD Reply Address UDH |
| user data length | User Data Length | TP-UDL |
| user data (content) | User Data | TP-UD |
| sub-address | Sub-address | (no counterpart) |
| service category | Service Category | (no counterpart) |
| multi-encoding in User Data | Multi-encoding User Data | (no counterpart) |
| user response code | User Response Code | (no counterpart) |
| deferred delivery | Deferred Delivery requests | (no counterpart) |
| message priority | Priority | (no counterpart) |
| message privacy | Privacy | (no counterpart) |
| read acknowledgement request | Read Ack Request in Reply Option | (no counterpart) |
| alert recipient | Alert Mode | (no counterpart) |
| which language | Language Indicator | (no counterpart) |
| display mode | Display Mode | (no counterpart) |
| message deposit index | Message Deposit Index | (no counterpart) |
| programming data for Service Category | Service Category Programming Data | (no counterpart) |
| programming results for Service Category | Service Category Programming Results | (no counterpart) |

PROVIDING TRANSPARENT CDMA SHORT MESSAGE SERVICE USING NON-CDMA MOBILE DEVICES, SMART CARDS AND NETWORKS

FIELD OF THE INVENTION

The present invention relates generally to wireless digital messaging communication and more specifically to methods and systems for sending, receiving, storing, reading, and processing CDMA type SMS messages on wireless networks, mobile devices, or multimode mobile devices which may utilize non-CDMA protocols and standards.

BACKGROUND OF THE INVENTION

Short Message Service (SMS), as the name implies, is a messaging service provided by wireless cellular networks for the exchange of short digital messages between mobile devices. Sometimes referred to as text messaging, these short digital messages may be user-specific messages intended for a specific recipient mobile device or broadcast messages intended for receipt by multiple mobile devices. Often when the SMS message is received by a mobile device, the SMS message is stored for future viewing in either an internal memory or in a removable memory module, such as a smart card device.

SMS may be supported by a variety of wireless communication systems, including code division multiple access (CDMA) systems and time division multiple access (TDMA) systems. Examples of a CDMA system include, but are not limited to cdma2000, W-CDMA, and IS-95. Examples of a TDMA system include, but are not limited to GSM (Global System for Mobile Communications) and its derivatives, such as UMTS (Universal Mobile Telecommunications Systems). Such TDMA communication systems are referred to herein as non-CDMA communication systems.

The particular form of SMS protocol being implemented on a wireless communication system will depend on which communication system technology is being employed. The different SMS implementations have different capabilities and utilize different message types and formats for sending short messages. Nevertheless, while CDMA and GSM type networks may differ and support different SMS implementations, mobile devices supported by a CDMA network may send messages to a mobile device supported by a GSM network and vice versa through one or more intervening digital communication networks. Typical mobile devices are single mode, meaning that they support communication with only one type of cellular network system, and thus support only one form of SMS. A multi-mode mobile device can support communication with more than one type of cellular network system, such as communication with a CDMA network and a GSM network, and thus support more than one form of SMS.

Since GSM SMS and CDMA SMS implement different SMS message types, formats, and protocols, it may not be possible to fully translate a CDMA SMS message into a GSM SMS message without loss of some information. This is because some of the message parameters or message types available in one SMS format are not defined in the other SMS format. In particular, non-CDMA wireless mobile devices, such as GSM/UMTS cellular mobile devices, may not support the full range of message parameters which are included in a CDMA SMS message. For example, a CDMA SMS message may include parameters specifying privacy, urgency, or delay of a message, which are parameters that do not appear in a GSM SMS message. Thus, when a CDMA mobile device sends a SMS message to a GSM mobile device, the additional message parameters supported by the CDMA mobile device are lost (i.e., they are not forwarded on) when received by the GSM mobile device. If the GSM mobile device which received the SMS message from the CDMA mobile device were to forward the SMS message to another CDMA mobile device, the additional CDMA SMS parameters would continue to be absent in the SMS message sent to the second CDMA mobile device, despite the second CDMA mobile device's ability to support the lost parameters. Accordingly, a system and method are desired which preserve the additional CDMA SMS parameters when sent to a non-CDMA mobile device.

SUMMARY OF THE INVENTION

An embodiment enables a CDMA SMS message to be sent, received, or otherwise processed as a non-CDMA SMS message without any loss of data. Further, an embodiment may enable the storing of a CDMA SMS message to the SIM/USIM module used in a non-CDMA mobile device and similarly enable the reading of a CDMA SMS message from the SIM/USIM module. A non-CDMA single mode mobile device or multimode mobile device that is operating in non-CDMA mode can send, receive, and store CDMA SMS messages while preserving all of the CDMA SMS messages parameters. An embodiment can do so by embedding all of the original CDMA SMS message parameters, including unsupported parameters, within the user data field—or payload—of a non-CDMA SMS message. Such a non-CDMA SMS host message can be explicitly marked with a unique indicator or distinguishing feature in the header format. A non-CDMA SMS host message marked with the indicator may then be handled specially as needed by the mobile device, whether it be a CDMA, multi-mode, or non-CDMA mobile device. The special handling may include the generating and embedding of the CDMA SMS message wholly within a non-CDMA SMS host message, the transmitting of such a non-CDMA SMS host message, the storing or reading of such a non-CDMA SMS host message in a SIM/USIM module, the extraction of the embedded CDMA SMS message, or the receiving and subsequent interpretation of such a non-CDMA SMS host message.

BRIEF DESCRIPTION OF THE DRAWINGS

The accompanying drawings, which are incorporated herein and constitute part of this specification, illustrate presently preferred embodiments, and, together with the general description given above and the detailed description given below, serve to explain features of the embodiments.

FIG. 3C is a message diagram showing more details of a CDMA SMS message embedded in a non-CDMA SMS host message.

FIG. 3D is a table of parameters which may appear in a SMS message.

DETAILED DESCRIPTION

Figure 1:
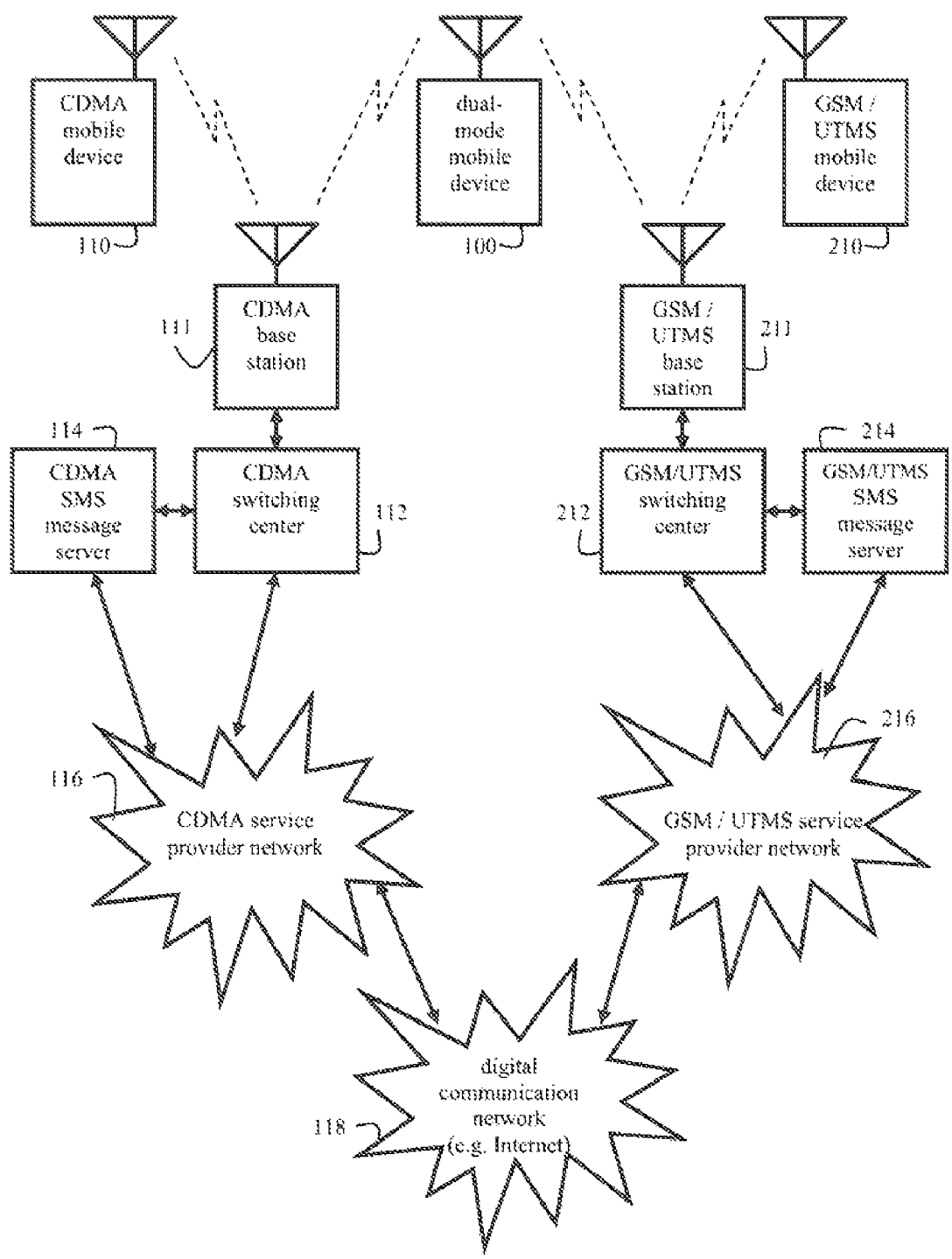
FIG. 1 is a block diagram of a typical system in which an embodiment may operate.

Various embodiments of the present invention will be described in detail with reference to the accompanying figures. Wherever possible, the same reference numbers will be used throughout the drawings to refer to the same or like parts.

Descriptions of the various embodiments refer to non-CDMA communication systems. For sake of simplicity, reference will be made to GSM or UMTS (GSM/UMTS) as being non-CDMA communication systems, but such reference is not intended to limit the scope of the invention or claims. Similarly, reference will be made to cdma2000 and other CDMA derivatives as being CDMA communication systems. For simplicity this description will call SMS messages sent by non-CDMA mobile device or transmitted by non-CDMA cellular network a "non-CDMA SMS host message."

As used herein, the terms "mobile device", "mobile handset" and "handheld device" refer to any one or all of cellular telephones, personal digital assistants (PDAs) with wireless modems, wireless electronic mail receivers (e.g., the Blackberry® and Treo® devices), multimedia Internet enabled cellular telephones (e.g., the iPhone®), laptop wireless modems, and similar personal electronic devices which provide for SMS service. In a preferred embodiment, the mobile device is a cellular telephone. However, cellular telephone communication capability is not necessary in all embodiments.

The Short Message Service (SMS), often called text messaging provides a means for sending short messages to and from mobile devices. SMS was originally defined as part of the GSM series of standards in 1985 as a means for sending messages of up to 160 characters to and from GSM mobile devices. Since then, support for the SMS service has expanded to include alternative mobile standards such as ANSI CDMA networks and AMPS, satellite and landline networks. Most SMS messages are mobile-to-mobile text messages, though the standard supports other types of broadcast messaging as well.

SMS makes use of a SMS message server, which acts as a store and forward center for short messages. The SMS message server may communicate with a digital communication network, such as the Internet, the Public Land Mobile Network (PLMN) or a public switched telephone network (PSTN) via Interworking and Gateway Mobile Switching Centers (MSCs).

Mobile-originated SMS messages are communicated from the mobile device to a SMS message server via a cellular telephone network, and may be destined for other mobile device users, subscribers on a fixed network, or Value-Added Service Providers (VASPs). A mobile device-originated (MO) SMS message is a message transmitted from a mobile device. SMS messages to VASPs are known as application-terminated messages. Mobile-terminated SMS messages destined for a particular mobile device are communicated from the SMS message server to the destination mobile device, and may originate from other mobile devices, from fixed network subscribers, or from other sources such as VASPs. A mobile-terminated (MT) SMS message is a message received at a mobile device. SMS messages originated from VASPs are known as application originated SMS messages. Due to the various uses of the SMS message beyond the mere communication of text messages, the additional parameters included in a SMS message transmission may be critical. Thus, it is useful to preserve the additional parameters included in the SMS message transmission.

Referring to FIG. 1, an embodiment may operate within a system of communication networks which may include a CDMA service provider network 116 (CDMA network), a GSM/UMTS service provider network 216 (GSM/UMTS network), and one or more digital communication networks 118 linking the two service provider networks. The one or more digital communication networks 118 may be the Internet, for example, and/or a digital telephone network containing a gateway between the CDMA and GSM networks. Alternatively, the CDMA network 116 and the GSM/UMTS network 216 may be directly connected.

The CDMA network 116 may communicate with one or more CDMA mobile devices 110 through a CDMA switching center 112 and a CDMA base station 111. Associated with the CDMA switching center 112 may be a CDMA SMS message server 114. The CDMA SMS message server 114 may directly connect to the CDMA network 116. The GSM/UMTS network 216 may communicate with one or more GSM/UMTS mobile devices 210 through a GSM/UMTS switching center 212 and a GSM/UMTS base station 211. Associated with the GSM/UMTS switching center 212 may be a GSM/UMTS SMS message server 214. The GSM/UMTS SMS message server 214 may directly connect to the GSM/UMTS network 216.

A dual-mode or multimode mobile device 100 can communicate—that is, transmit and receive—with either or both the CDMA base station 111 and the GSM/UMTS base station 211, although not necessarily simultaneously. Typically a multimode mobile device 100 will operate in only one mode at a time.

The CDMA SMS message server 114 may exchange SMS messages with the GSM/UMTS message server 214 through their respective service provider networks 116, 216 and through one or more digital communication networks 118 which connect the service provider networks 116, 216.

Figure 2A:
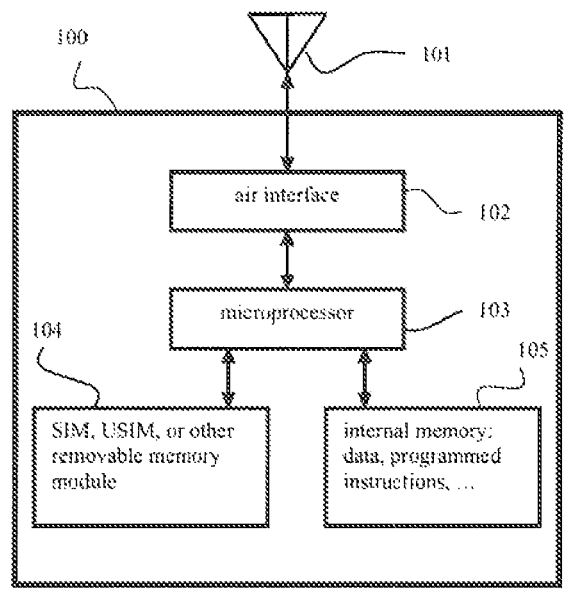
FIG. 2A is a simplified block diagram of a mobile device.

Referring to FIG. 2A, a multimode mobile device 100 may include at least the following components: an antenna 101, a radio frequency air interface 102, and a microprocessor 103, a smart card removable memory module (104, and internal memory 105. Examples of smart card devices include, but are not limited to, SIM (Subscriber Identify Module) and UICC (Universal Integrated Circuit Card) used in GSM and UMTS mobile devices, respectively, R-UIM (Removable User Identity Module) used in CDMA type mobile devices, and SD (secure data) or flash memory cards used in a variety of mobile devices.

The antenna 101 and the air interface 102 support two-way radio frequency communication with a base station 111 or 211 utilizing a CDMA, GSM/UMTS, or other wireless communication protocol. The microprocessor 103 may control the overall operation of the mobile device 100 and is coupled to both the smart card memory module 104 as well as the internal memory 105. The smart card memory module 104 may be removable and may contain stored SMS messages, phone numbers, contact information, and provisioning data configuring the mobile device 100. The internal memory 105 may contain programmed applications for the microprocessor 103, data used in conjunction with the programmed applications, and SMS messages.

A single-mode GSM/UMTS or CDMA mobile device 210, 110 may include components similar to those of the multi-mode mobile device 100.

Figure 2B:
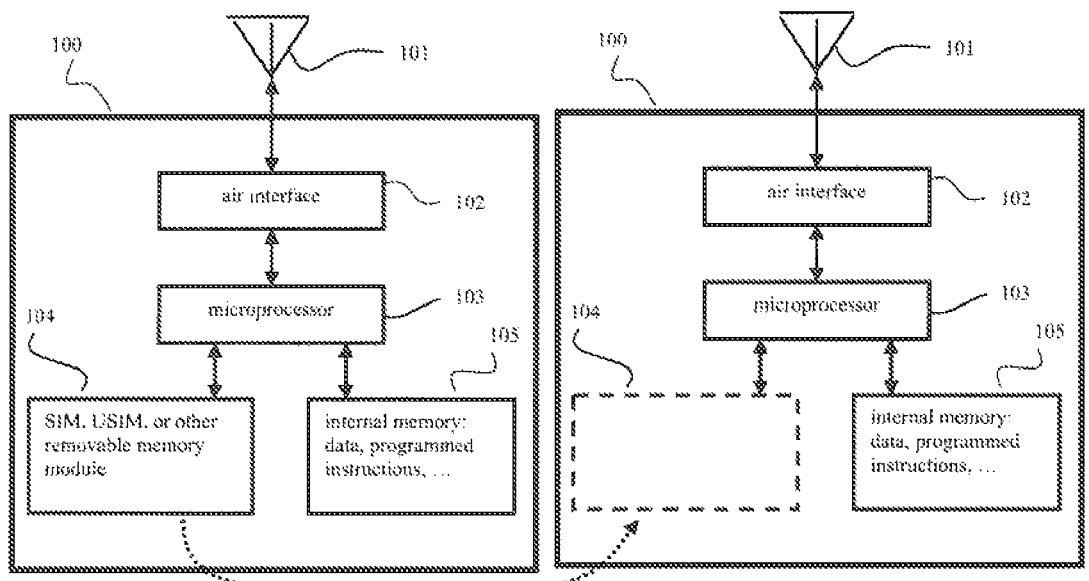
FIG. 2B is a simplified block diagram of two mobile devices with a single SIM/USIM memory module in common.

FIG. 2B illustrates components of a first multi-mode mobile device 100 and a second multi-mode mobile device 100A into which one removable smart card memory module 104 may be inserted. The smart card memory module 104 may be removed from the first multi-mode mobile device 100 and be inserted into the second multi-mode mobile device 100A. All content of the smart card memory module 104, which was originally accessible to the first multi-mode mobile device 100 before the removal will be accessible to the second multi-mode mobile device 100A after the smart card memory module 104 is inserted. A smart card memory module is said to be accessible if a mobile device can read and potentially also store messages and other data from or to the smart card memory module respectively. In particular, all SMS messages stored on the smart card memory module 104 may be preserved and transferred to the second mobile device 100A. It should be noted that the smart card memory module 104 may also be removably inserted from a first GSM/UMTS mobile device 210 to a second GSM/UMTS mobile device 210A or even from a multi-mode mobile device 100 to a GSM/UMTS mobile device 210 supporting only a single mode. In each instance, the data stored on the smart card memory module 104 should be accessible to the processor 103 of each mobile device 100, 100A. Accordingly, as the smart card is transferred from one mobile device to another, it is beneficial that any received CDMA SMS message parameters be preserved on the smart card memory module 104 for future use.

Figure 3A:
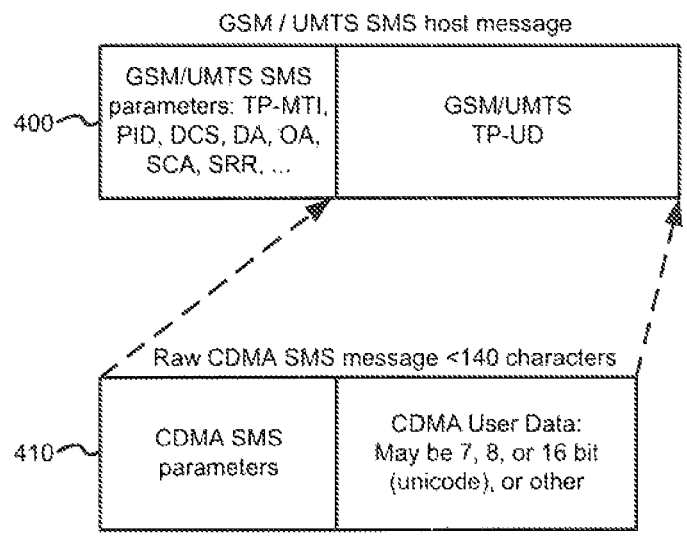
FIG. 3A is a message diagram showing a CDMA SMS message embedded in a non-CDMA SMS host message.
Figure 3B:
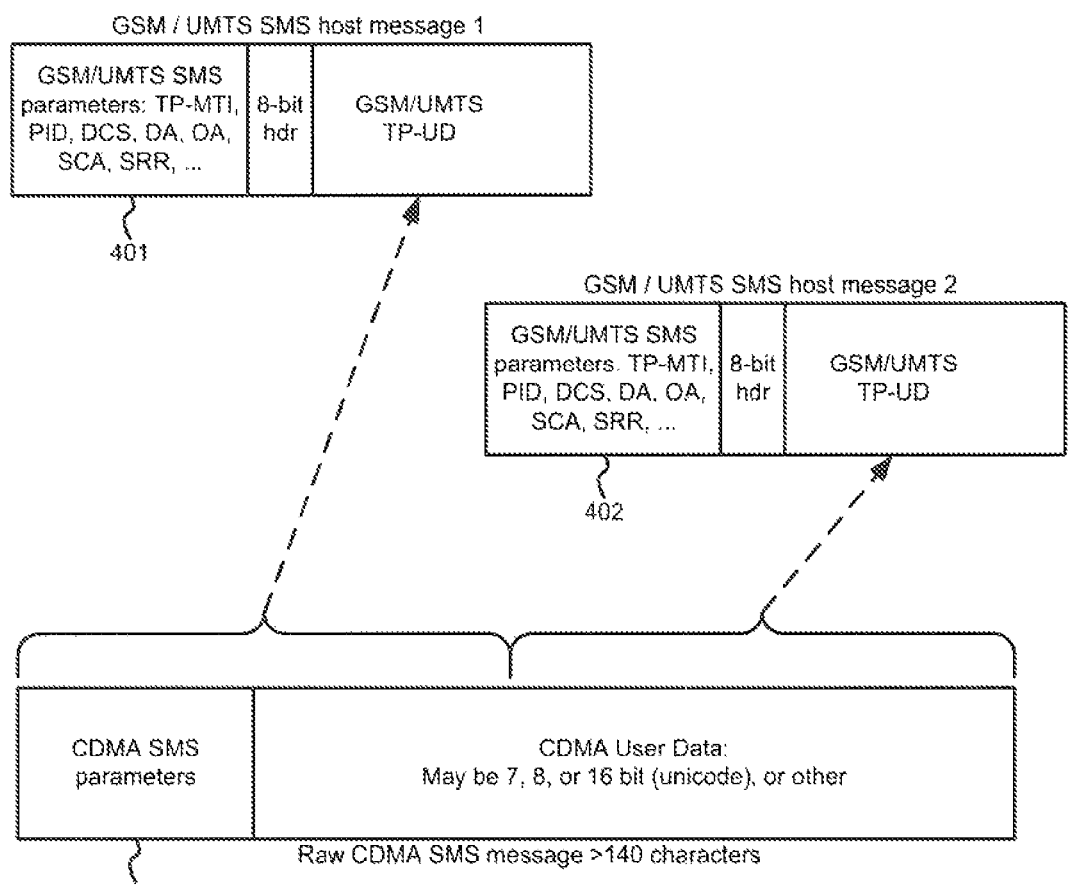
FIG. 3B is a message diagram showing a CDMA SMS message embedded in two non-CDMA SMS host message.

The various embodiments retain all of the SMS parameters enabled in CDMA SMS message when transmitted or stored in GSM/UMTS format by embedding the CDMA SMS message within a GSM/UMTS message, as illustrated in FIG. 3A through 3C.

FIG. 3A is a message diagram of a CDMA SMS message 410 embedded within a GSM/UMTS SMS host message 400. As shown in FIG. 3A, if the raw CDMA SMS message 410 is less than or equal to 140 characters, then both the CDMA SMS parameters typically found in a CDMA SMS message header as well as a CDMA SMS message payload are embedded with the User Data field, TP-UD, of the GSM/UMTS SMS message 400. In this manner, the embedded CDMA SMS message 410 retains all of the original information and metadata, including the additional CDMA message parameters which are typically carried in a CDMA SMS message header. The CDMA SMS message 410 may be either a mobile-terminated (inbound to a mobile device) or a mobile-originated message (outbound from a mobile device).

FIG. 3B is a message diagram of a long CDMA SMS message 411 embedded within two GSM/UMTS SMS host messages 401, 402. As shown in FIG. 3B, if the raw CDMA SMS message 411 is longer than 140 characters, the entire message will exceed the GSM/UMTS SMS message User Data size limit. Therefore, in this circumstance the CDMA SMS is broken into two parts, with the parameters typically found in a CDMA SMS message header as well as a portion of the CDMA SMS message payload being embedded with the User Data field, TP-UD, of a first GSM/UMTS SMS host message 401, and the remainder of the CDMA SMS message payload being embedded with the User Data field, TP-UD, of a second GSM/UMTS SMS host message 402. A symbol, such as a concatenation 8-bit header 403, is included in both GSM/UMTS SMS host messages to indicate that the two host messages belong to a single long CDMA SMS message. In this manner, the embedded CDMA SMS message 411 retains all of the original information and metadata, including the additional CDMA message parameters which are typically carried in a CDMA SMS message header. The CDMA SMS message 411 may be either a mobile-terminated (inbound to a mobile device) or a mobile-originated message (outbound from a mobile device).

FIG. 3C illustrates the GSM/UMTS SMS host message 400 in more detail. Like every SMS message, the GSM/UMTS SMS host message 400 includes a sequence of bits, subsequences of which constitute fields of various lengths. FIG. 3C shows some parameter fields of the GSM/UMTS SMS host message 400 and some parameter fields of the embedded CDMA SMS message 410. Many fields irrelevant to the present description are not shown. Each GSM/UMTS parameter field is one or more consecutive bits representing a binary value or bit pattern for a parameter. The Message Type field, TP-MTI, indicates the particular type of GSM/UMTS message, such as an SMS Submit message. The Protocol Identifier field, TP-PID, indicates the protocol of the message, such as telex, group 3 telefax, or an Internet e-mail message. The Data Encoding Scheme field, TP-DCS, indicates the encoding scheme, such as the number of bits in the text characters and whether the text is compressed. The meaning and use of such SMS parameter fields are known to those of ordinary skill in the art of SMS message formats The Telecommunications Industry Association's TIA/EIA-637 specification describes the parameters for the Transport Layer and the subparameters of the Bearer Data and is incorporated herein by reference. The CDMA SMS capabilities are defined in TIA/EIA-637C. GSM/UMTS SMS capabilities are defined in 3GPP 23.040. The TIA/EIA-637, TIA/EIA-637C and 3GPP 23.040 specifications are hereby incorporated by reference in their entirety.

The embedded CDMA SMS message 410 constitutes the contents of the User Data field, TP-UD, of the GSM/UMTS SMS host message 400, which may be created specifically to host an embedded CDMA SMS message 410. Some of the parameter fields of the GSM/UMTS SMS host message 400 may need to be set based on the embedded CDMA SMS message 410. For example, the User Data Length field, TP-UDL, is set to specify the length of the TP-UD field contents—namely the size of the embedded CDMA SMS message 410. The Data Coding Scheme parameter field, TP-DCS, may be set to indicate encoding of the contents of the TP-UD field, such as octets (8-bit encoding). Furthermore, it may be desirable to explicitly indicate that the GSM/UMTS SMS host message 400 embeds a complete, raw CDMA SMS message 410.

An alternative embodiment embeds only a portion of the CDMA SMS message 410 in the GSM/UMTS SMS host message 400. In particular, an SMS parameter in the CDMA SMS message 410 which has a counterpart parameter in GSM/UMTS SMS message format may be omitted if the CDMA SMS parameter is used to set the counterpart parameter in the GSM/UMTS SMS host message 400. CDMA parameters appearing in the CDMA SMS message 410 which have no GSM/UMTS counterpart—as well as the User Data—are included in the portion of the CDMA SMS message 410 embedded in the GSM/UMTS SMS host message.

It may be advantageous to simply and unambiguously indicate that a GSM/UMTS SMS message is a GSM/UMTS SMS host message 400, such as by including a parameter or flag in such messages. For example, it may facilitate the programming of applications if a parameter or flag can be accessed to determine that a GSM/UMTS SMS message (such as a message stored on a smart card) is actually a GSM/UMTS SMS host message 400 that contains an embedded CDMA SMS message 410 in the User Data field. That way, the appropriate routine may be used to unpack and read the GSM/UMTS SMS message. Because the GSM/UMTS SMS User Data field may be an arbitrary sequence of bits, it may be difficult to implicitly determine from the sequence of bits alone whether the sequence constitutes an embedded CDMA SMS message 410.

One method for explicitly indicating that a GSM/UMTS SMS message is a GSM/UMTS SMS host message 400 includes a new, specific bit pattern in the GSM/UMTS SMS TP-DCS parameter field. The bits in the TP-DCS parameter field normally indicate the encoding scheme of certain fields in a GSM/UMTS SMS message. For example, the octet bit pattern '1000xxxx' is currently reserved for future use, where the bits 'xxxx' are used for other purposes and may be 0 or 1. Therefore, the octet bit pattern '1000xxxx' may be an indicator that the User Data field, TP-UD, contains an embedded CDMA SMS message in the payload.

An alternative method of explicitly indicating that a GMS/UMTS SMS message is a GSM/UMTS SMS host message 400 employs a new bit pattern in the Protocol Identifier field, TP-PID, of the GSM/UMTS SMS host message 400. For example, the binary value '10000000' in the TP-PID can be the new TP-PID value. Another method of indicating a GSM/UMTS SMS host message 400 may use both a new TP-DCS bit pattern and a new TP-PID bit pattern. Any other way of indicating a GSM/UMTS SMS host message 400 may be used as long as it does not affect backward compatibility with regular GSM/UMTS SMS messages.

In FIG. 3C a CDMA SMS message 410 is embedded within a GSM/UMTS SMS host message 400, where the CDMA SMS message 410 is either a CDMA SMS Deliver Message 412 or a CDMA SMS Submit Message 412. A CDMA SMS Deliver Message is a point-to-point SMS message received at a mobile device. A CDMA SMS Submit Message is a point-to-point SMS message originating from a mobile device. The Msg_Type, Teleservice Id and Bearer Reply Option are example parameter fields which may appear in a CDMA SMS message 410. The Transport Layer MSG-_TYPE field indicates Point-to-Point, Ack or Broadcast type messages. The Teleservice Id is analogous to the notion of a port number in the TCP/IP protocol, where different teleservice Id's are used for different purposes, such as WAP push notifications or voicemail notifications. The Bearer Reply Option indicates whether the base station should send an SMS acknowledge message including the cause of an error, if any. For illustration, FIG. 3C shows some example fields that may appear in a CDMA SMS Deliver Message 412 or a CDMA SMS Submit Message 412. Some of these example fields are not germane to the present description, but are known to those of ordinary skill in the art of CDMA SMS message formats.

When embedding a CDMA SMS message 410 in a GSM/UMTS SMS host message 400, the parameters of the GSM/UMTS SMS host message 400 may be set to values based on some of the parameters of the embedded CDMA SMS message. The GSM/UMTS Message Type Identifier parameter, TP-MTI, of the GSM/UMTS SMS host message 400 may be set to reflect the message type of the embedded CDMA SMS message 410. There is at least one way to map CDMA SMS message types to GSM/UMTS SMS message types which a mobile device 100, 110, 210 may send or receive.

In particular, a mobile-originated (MO) CDMA SMS Point-to-Point message type may be mapped to the GSM/UMTS Submit message type. In this case, the Destination Address parameter, TP-DA, of the GSM/UMTS SMS host message 400 may be set to the Destination Address in the CDMA SMS message 410. The Service Center Address parameter, TP-SCA, may be set the same way as in other regular GSM/UMTS SMS messages. The Status Report Requested parameter, TP-SRR, in the GSM/UMTS SMS message may be set to False.

Further, a mobile-terminated (MT) CDMA SMS Point-to-Point message type may be mapped to the GSM/UMTS Deliver message type. In this case, The RP-Origination Address in the GSM/UMTS SMS host message 400 is set to the Origination Address of the CDMA SMS message 410. If the CDMA SMS message 410 requests User Acknowledgement, the Reply Path field in the GSM/UMTS SMS message can be set to TRUE. Similarly, the various CDMA SMS acknowledgement messages for a CDMA SMS message 410 may be sent out to the network from the mobile device using the Submit message as defined above.

FIG. 3C illustrates the embedding of the common CDMA point-to-point message types, but other CDMA message types can be embedded similarly, if desired. Namely, another type of CDMA SMS message 410 can be embedded, as-is, in the User Data field, TP-UD, of a GSM/UMTS SMS host message 400. Some of the other types of CDMA SMS messages include Cancellation, Transport Layer Acknowledgement, Delivery Acknowledgement, User Acknowledgement, and Read Acknowledgement messages. Further, CDMA SMS messages may be broadcast messages. An embodiment may additionally embed any or all of the acknowledgment and/or broadcast type CDMA SMS messages in a GSM/UMTS SMS host message 400 in the same manner as described above. For example, an embodiment may embed a CDMA SMS Transport Layer Acknowledgement message in the GSM/UMTS Submit Report message or Deliver Report message-depending on whether the message is mobile-originated or mobile-terminated respectively. However, this embodiment may require that the network side also maps these messages accordingly. Similarly, an embodiment may embed the CDMA SMS Delivery Acknowledgement message in the GSM/UMTS Status Report message as long as the network side also maps these messages accordingly. However, to minimize the network changes and for better transparency, only GSM Submit and Deliver messages may be used to carry all types of CDMA SMS messages.

FIG. 3D is a table of the standard SMS parameters for mobile-terminated messages and/or for mobile-originated messages. The meaning and use of these SMS parameters is well known to those skilled in the art of digital cellular communication. FIG. 3D is included for reference and as an aid for understanding the figures. Some of the SMS parameters which are relevant to the embodiments described herein were discussed previously, including the User Data, the Data Coding Scheme, and the Protocol Identifier. Other parameters will be discussed in connection with FIGS. 5A, 5B, 6A, and 6B. In particular, FIG. 3D lists CDMA SMS parameters which have no corresponding counterpart in GSM and thus no corresponding functionality within GSM/UMTS.

Figure 4A:
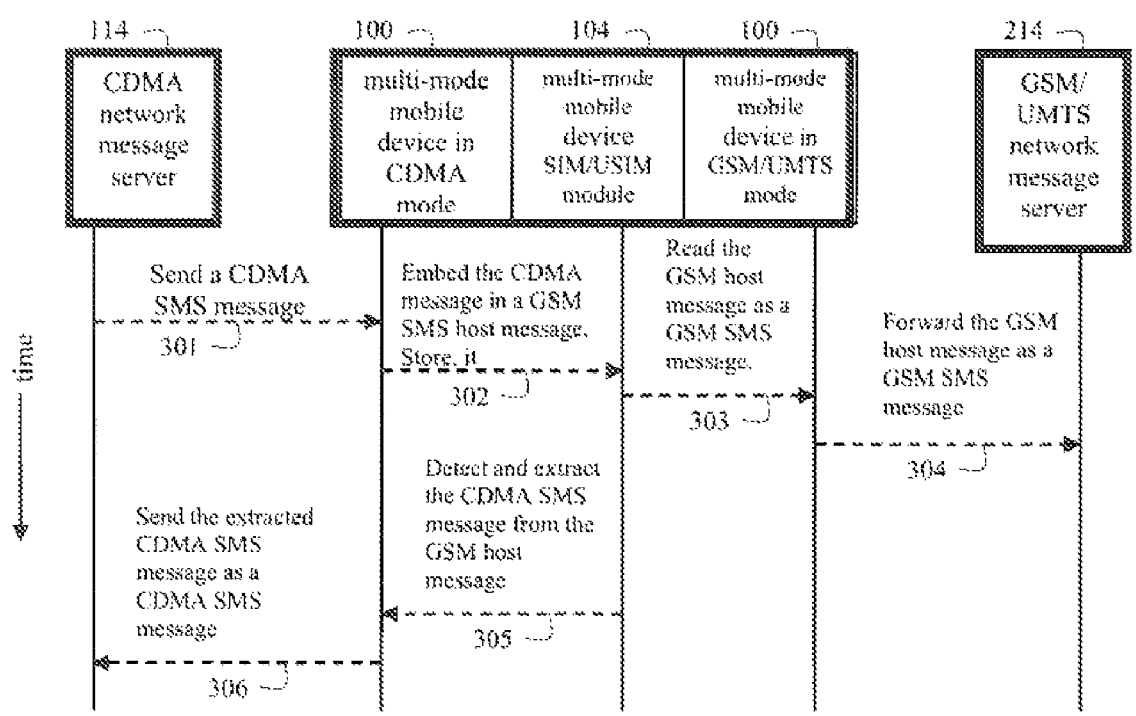
FIG. 4A is a timeline of communication events among a CDMA network, a multimode mobile device, and a non-CDMA network.

FIG. 4A illustrates a timeline of events that may occur when a CDMA SMS message is sent to a multi-mode mobile device 100 operating in CDMA mode which then stores the message on smart card for access by the mobile device when it is operating in GSM/UMTS mode. Elements referenced in the following description which are not shown in FIG. 4A refer to elements illustrated in FIGS. 1, 2A, 2B, 3A, 3B and/or 3C. In FIG. 4A, the CDMA network message server 114 sends a CDMA SMS message to a multimode mobile device 100 in which the air interface 102 is operating in CDMA mode, step 301. The CDMA SMS message may be any type of CDMA SMS message, including for example, a point-to-point message, a broadcast message, or a CDMA SMS acknowledgement message The CDMA SMS message 410 is embedded within a GSM/UMTS SMS host message 400 and may be stored to the smart card module 104 or to other local memory 105, step 302, using a procedure described below with reference to FIGS. 5A, 5B, and 6A. At this point, the multimode mobile device 100 may switch to GSM/UMTS mode and make radio contact with a GSM/UMTS network message server 214 through a GSM/UMTS base station 211 and a GSM/UMTS switching center 212.

With the CDMA SMS message embedded in a GSM/UMTS SMS host message 400 stored in the smart card memory module 104 or other memory 105, a user may manipulate the message as the user would manipulate any GSM/UMTS SMS message. For example, the GSM/UMTS SMS host message 400 may be read and then forwarded (sent) to a GSM/UMTS network message server 214, steps 303 and 304. To accomplish the forwarding, the GSM/UMTS SMS host message 400 passes from the smart card memory module 104 to the GSM/UMTS network server 214 through the following elements: the microprocessor 103, the air interface 102, the antenna 101, the GSM/UMTS base station 211, and the GSM/UMTS switching center 212. Thereafter the message may be forwarded to a GSM/UMTS mobile device 210, through the GSM/UMTS network 216 or to some other destination through digital communication network 118.

Alternatively, the GSM/UMTS SMS host message 400 may be sent in CDMA mode to a CDMA mobile device 110 or other multi-mode device 100A operating in the CDMA mode. The mobile device 100 may extract the embedded CDMA SMS message 410 from the GSM/UMTS SMS host message 400 in preparation to forward the CDMA SMS message to a CDMA mobile device 110 or other multi-mode device 100A operating in the CDMA mode, step 305. The mobile device 100, in CDMA mode, may then transmit the extracted CDMA SMS message to the CDMA mobile device 110 or other multi-mode device 100A operating in the CDMA mode via the CDMA network SMS message server 114, step 306.

Figure 4B:
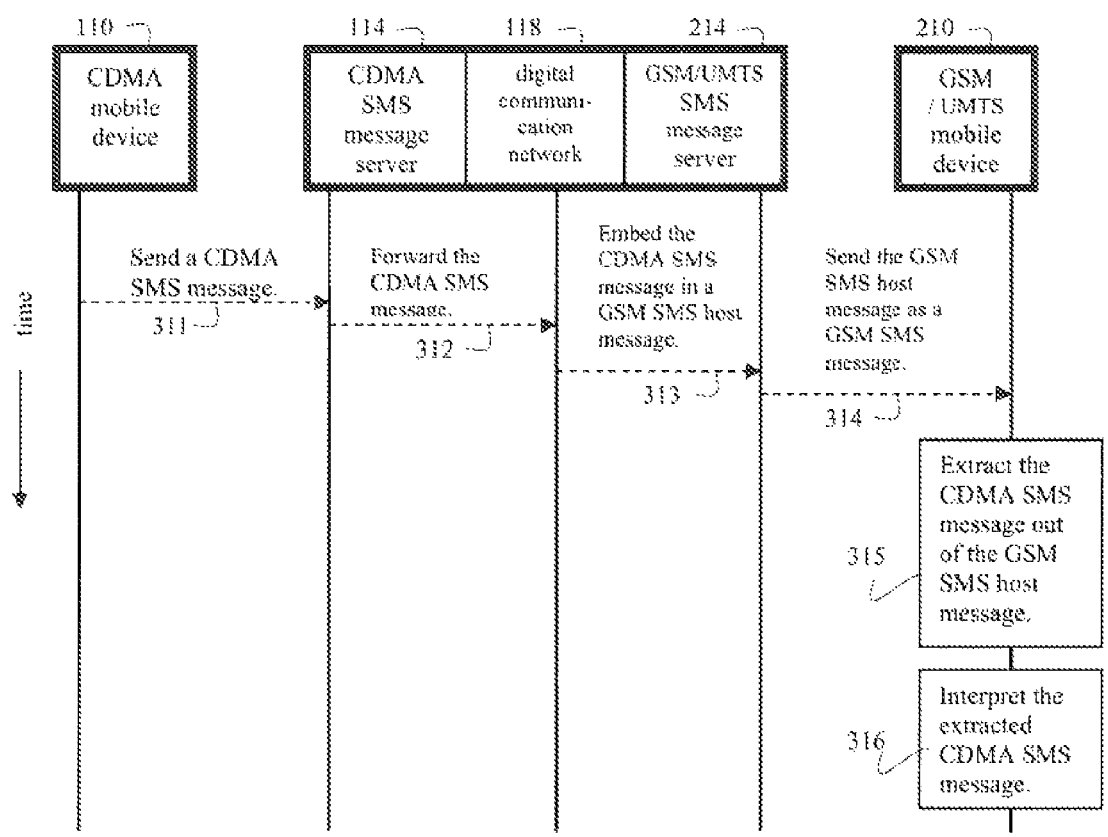
FIGS. 4B and 4C are timelines of communication events among a CDMA mobile device, network message centers, and a non-CDMA mobile device.

FIG. 4B illustrates a timeline of events in which a CDMA SMS message 410 is sent from a CDMA mobile 110 (or multimode mobile 100) operating in CDMA mode. Elements referenced in the following description which are not shown in FIG. 4B refer to elements illustrated in FIGS. 1, 2A, 2B, 3A, 3B and/or 3C. The CDMA SMS message 410 may be a Point-to-Point message or an SMS acknowledgement message. The CDMA SMS message 410 is sent to the CDMA SMS message server 114 via the CDMA base station 111 and the CDMA switching center 112, step 311. The CDMA SMS message server 114 may determine the destination of the sent CDMA SMS message 410. If the intended destination of the CDMA SMS message 410 is another CDMA mobile device 110 then the CDMA SMS message may be sent onward via the CDMA switching center 112 to the second CDMA mobile device 110 via base station 111. Alternatively, if the intended destination is a non-CDMA mobile device 210, the CDMA SMS message may be forwarded to a GSM/UMTS SMS message server 214 via the CDMA service provider network 116, the digital communication network 118 and the GSM/UMTS service provider network 216, step 313. As the CDMA SMS message 410 is received by the GSM/UMTS SMS switching center 212—or at some point previously—the CDMA SMS message 410 may be embedded in a GSM/UMTS SMS host message 400, step 313. An embodiment of a procedure to perform the embedding is described in detail below with reference to FIGS. 5A and 5B. The GSM/UMTS SMS host message 400 contains the entirety of the original CDMA SMS message 410 in the User Data field, TP-UD, of the GSM/UMTS SMS host message 400. The GSM/UMTS SMS message server 214 may then send the GSM/UMTS SMS host message 400 to the intended GSM/UMTS mobile device 210 destination through a GSM/UMTS switching center 212 and a GSM/UMTS base station 211, step 314. The intended destination GSM/UMTS mobile device 210 may be a single-mode GSM/UMTS mobile device or may be a multimode mobile device 100 operating in GSM/UMTS mode.

Once the GSM/UMTS mobile device 210 (or multi-mode device 100 operating in GSM/UMTS mode) has received the GSM/UMTS SMS host message 400, the GSM/UMTS SMS host message 400 may be stored in a smart card memory module 104 or other local memory 105. Alternatively, the GSM/UMTS mobile device 210 may detect that the SMS message is actually a GSM/UMTS SMS host message 400. If so, the GSM/UMTS mobile device 210 may extract the original CDMA SMS message 410 out of the GSM/UMTS SMS host message 400 as shown in FIG. 4B, step 315. Then the GSM/UMTS mobile device 210 may interpret, process, or otherwise act on the contents of the original CDMA SMS message 410. For example, the GSM/UMTS mobile device 210 may contain software to interpret, respond to, or utilize the data and/or parameters contained in the embedded CDMA SMS message 410, step 316.

Figure 4C:
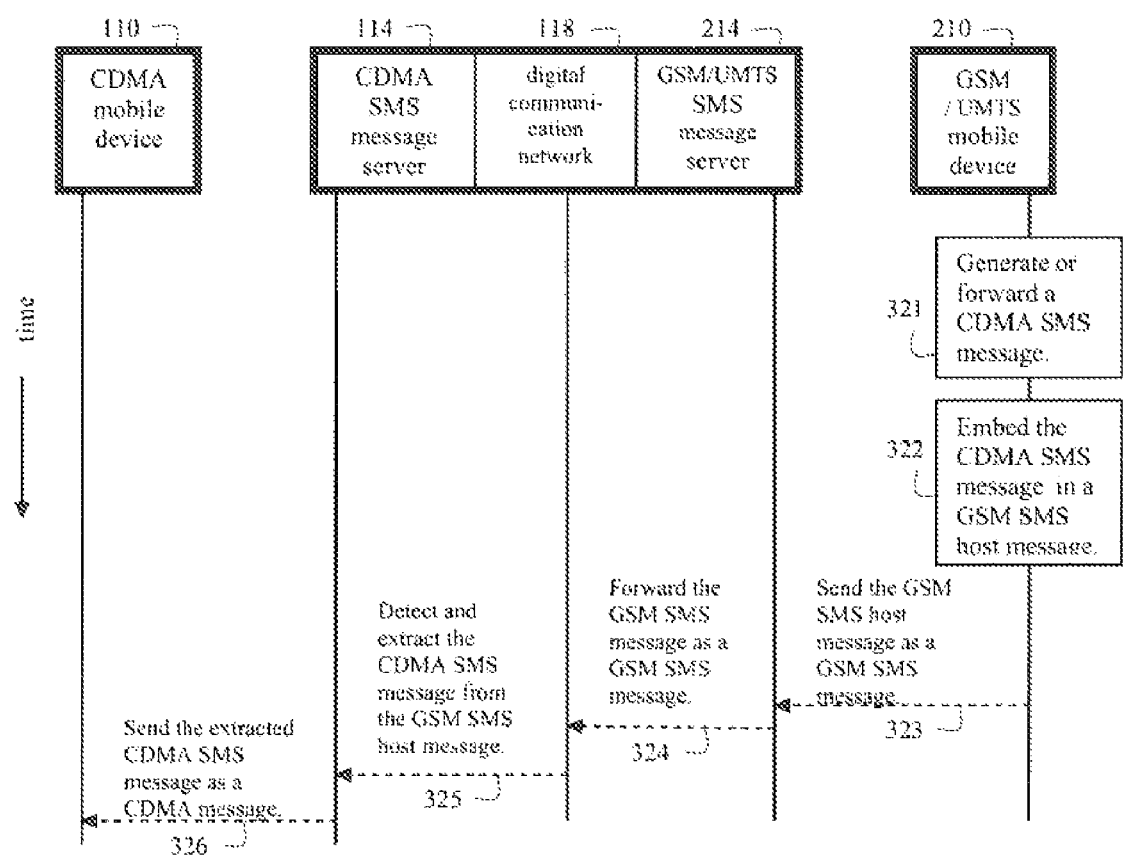

FIG. 4C is a timeline of events in which an embodiment may process a CDMA SMS message 410 originating from a single-mode GSM/UMTS mobile device 210 or from multi-mode mobile device 100 operating in the GSM/UMTS mode. Elements referenced in the following description which are not shown in FIG. 4C refer to elements illustrated in FIGS. 1, 2A, 2B, 3A, 3B, and/or 3C. FIG. 4C shows that the GSM/UMTS mobile device 210 may have some functionality for composing, forwarding, or otherwise generating a CDMA SMS message 410, step 321. For example, the functionality may be a software application for creating and sending a SMS message which specifically includes the capability of controlling a CDMA message parameter which has no GSM/UMTS counterpart, such as controlling the alert mode, priority, or privacy of a SMS message. A multimode mobile device 100 may have this capability, but an older model single mode GSM mobile device 210 may only be able to generate a GSM message and only set GSM parameters. This may be because an older GSM mobile device was never provided with software to generate anything but a GSM message. In an embodiment, a mobile device 100, 210 may be upgraded with a CDMA SMS message generation application which can specifically include any CDMA SMS parameters in a CDMA SMS message 410 and embed the CDMA SMS message 410 as necessary in a GSM/UMTS SMS host message 400.

The GSM/UMTS mobile device 210 (or multi-mode device 100 operating in GSM/UMTS mode) then may embed the CDMA SMS message 410 within a GSM/UMTS SMS host message 400, step 322. The type of GSM/UMTS SMS host message 400 may be an SMS Submit message, an SMS Status or an SMS Reply message. The GSM/UMTS SMS host message 400 may be sent to a GSM/UMTS SMS message server 214 through a GSM/UMTS base station 211 and a GSM/UMTS switching center 212, step 323. The GSM/UMTS SMS message server 214 may then determine the destination of the GSM/UMTS SMS host message 400, which may require that the GSM/UMTS SMS host message 400 be forwarded through one or more networks, step 324. The one or more networks may include the GSM/UMTS service provider network 216 associated with the GSM/UMTS SMS message server 214 and one or more interconnecting digital communications networks 118. The final destination network may be a CDMA network 116 having a CDMA SMS switching center 112 and a CDMA SMS message server 114. As the GSM/UMTS SMS host message 400 is received by the CDMA SMS switching center 112—or at some point previously—the CDMA SMS message 410 may be extracted from the GSM/UMTS SMS host message 400, step 325. In embodiments in which the entire original CDMA SMS message is embedded in the GSM/UMTS SMS host message 400, the extraction process may simply discard all of the GSM/UMTS SMS host message 400 except for the GSM/UMTS SMS user data TP-UD, which constitutes the preserved, original CDMA SMS message 410. In embodiments where the GSM/CDMA common parameters in the GSM/UMTS SMS host message 400 are set equal to the values in the CDMA SMS message but not included in the user data TP-UD, those common parameters will be extracted from the GSM/UMTS SMS header and appended to the embedded CDMA SMS message 410 to reproduce the original CDMA SMS message. The CDMA SMS message server 114 may then send the original CDMA SMS message to a destination CDMA mobile device 110 through a CDMA switching center 112 and a CDMA base station 111, step 326. The CDMA mobile device 110 may be a single-mode mobile device or may be a multimode mobile device 100 operating in CDMA mode.

Figure 5A:
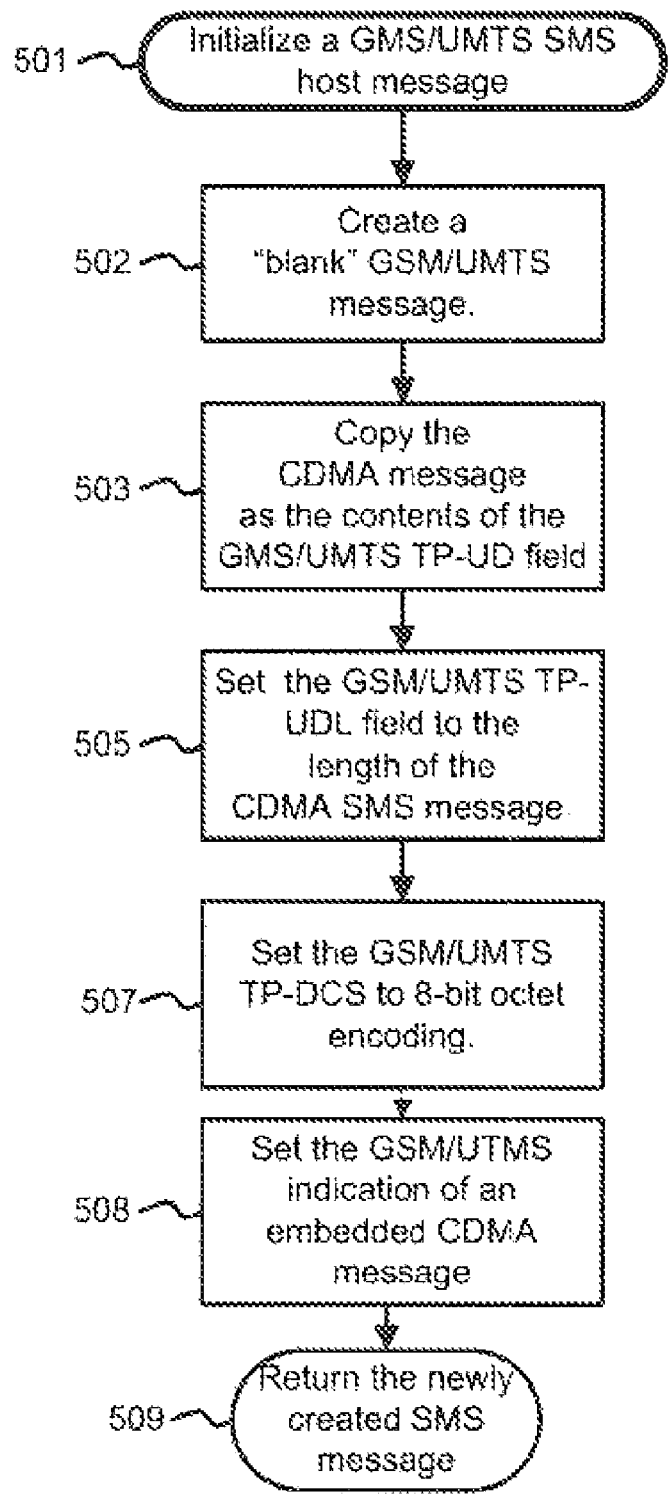
FIGS. 5A and 5B are flowcharts of procedures for embedding a CDMA SMS message within a non-CDMA SMS host message.

FIG. 5A is a flowchart of an embodiment process in the form of a software subroutine 501 for initializing a GSM/UMTS SMS host message. This subroutine 501 may be called by the SMS messaging application. The subroutine 501 constructs and begins initialization of a GSM/UMTS SMS host message and returns the new, partially initialized GSM/UMTS SMS host message. An argument to the subroutine 501 is the CDMA SMS message 410 to be embedded. Construction of a GSM/UMTS SMS host message 400 is begun by creating a "blank", or uninitialized, GSM/UMTS SMS message, such as in a portion of an allocated memory buffer, step 502. The memory buffer may be used to enable incrementally inserting or appending of various SMS parameters to the SMS message. The subroutine 501 may reserve fields in the buffer for common SMS parameters and may initialize the SMS parameters with default values. Next, the whole, raw argument CDMA SMS message 410 is copied into the User Data field, TP-UD, of the newly created GSM/UMTS SMS message, step 503. Then the value of the TP-UDL parameter field is set to the size of the contents of the TP-UD field, step 505. This TP-UDL parameter is the integer length of the newly embedded copy of the CDMA SMS message, such as its size in 8-bit octets. The TP-DCS parameter field is inserted into the GSM/UMTS SMS message (e.g., by storing bits in the appropriate fields in the memory buffer) with bit values set to indicate how the User Data, TP-UD, is encoded, such as 8-bit octets, as defined in the TIA/EIA-637 specification, step 507. An indicator that this SMS message will represent a GSM/UMTS SMS host message 400 may also be set by storing the corresponding bit pattern into the appropriate fields in the memory buffer, step 508. As described above, the indicator may be a specific bit pattern either in the TP-DCS field or in the TP-PID field or in both. Alternative forms for explicitly indicating that the message is a GSM/UMTS SMS host message 400 may be used.

The steps 503 through 508 may be performed in a different order than shown in FIG. 5A and some of the steps may be performed in parallel with each other. Further steps may be performed within the subroutine 501, such as providing default values for other GSM/UMTS SMS parameters.

The subroutine 501 illustrated in FIG. 5A exits (i.e., returns to the software process that called the subroutine) by returning the newly created SMS message to the calling procedure, returning a pointer to the memory buffer containing the newly created SMS message, or returning a flag indicating that the newly created SMS message has been successfully created in a standard memory buffer, step 509. For example, the calling procedure may be the procedure illustrated in the flowchart of FIG. 5B. Subsequent processing by a calling software procedure may insert further parameters into the SMS message and set the values of the parameters as needed.

Figure 5B:
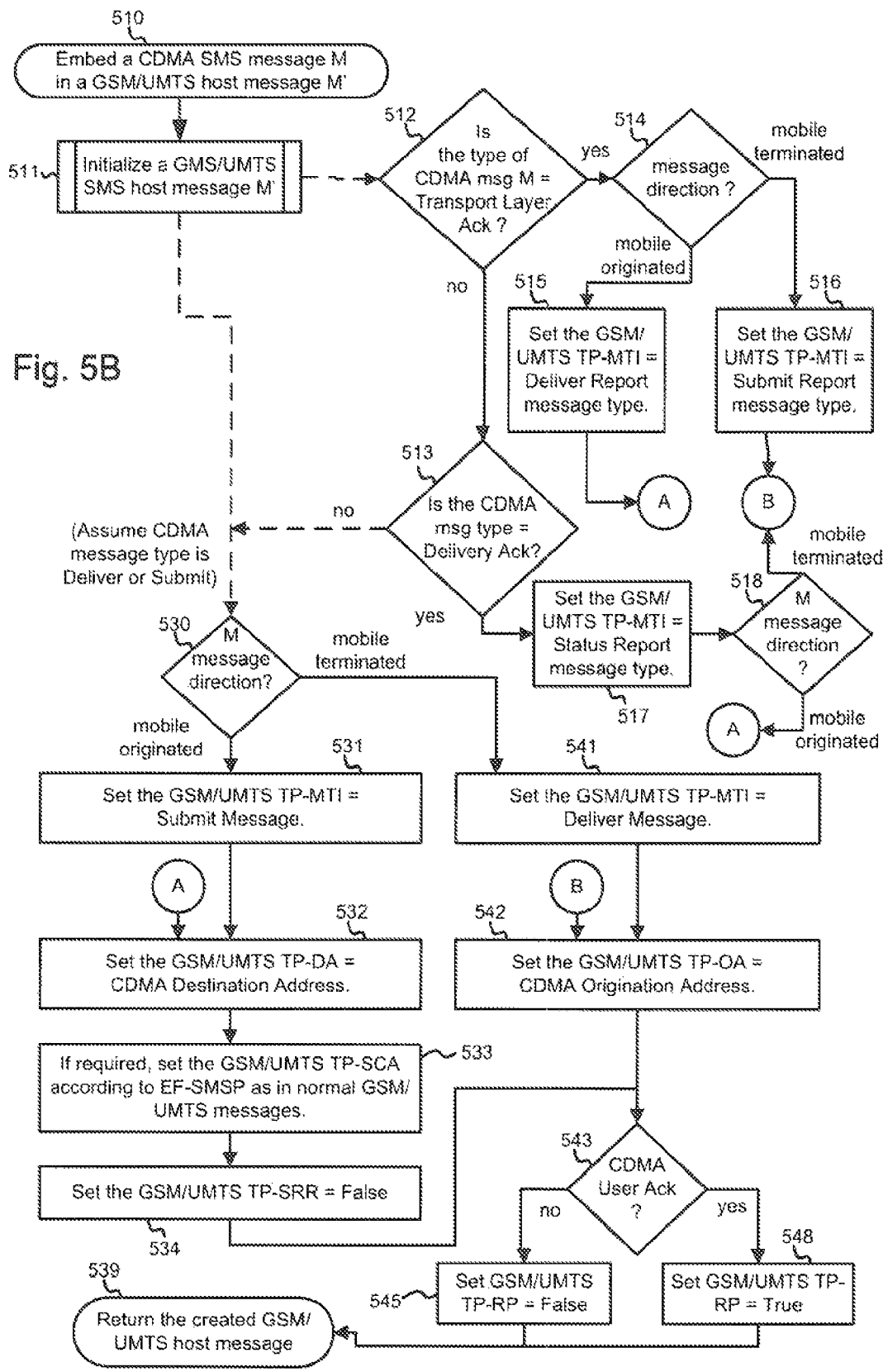

FIG. 5B is a flowchart of an embodiment of a procedure 510 for embedding a CDMA SMS message in a GSM/UMTS SMS message. The subroutine 510 accepts a CDMA SMS message 410 as an argument (i.e., input) and returns a new, complete GSM/UMTS SMS host message with the CDMA SMS message 410 embedded in the message payload. First, the procedure 510 calls the subroutine 501 described above and illustrated in FIG. 5A to create and begin initialization of a GSM/UMTS SMS host message 400 and to embed a copy of the CDMA SMS message 410 in the created GSM/UMTS SMS host message 400, step 511. The argument passed to the subroutine 501 is the CDMA SMS message 410 to be embedded. A partially constructed GSM/UMTS SMS message is returned from the called subroutine 501.

Thereafter, the procedure 510 maps each of several CDMA SMS parameters to a corresponding GSM/UMTS SMS parameter. If the CDMA message 410 is assumed to be a CDMA Point-to-Point message, the procedure 510 tests whether the CDMA SMS message 410 is mobile terminated or mobile originated, step 530. If the CDMA SMS message is mobile originated, the procedure 510 inserts the GSM/UMTS Message Type Indicator parameter, TP-MTI, into the GSM/UMTS SMS host message with a value indicating that the message is a GSM/UMTS Submit Message, step 531. Then the GSM/UMTS Destination Address parameter, TP-DA, is set with a value equal to the Destination Address in the CDMA SMS message, step 532. If required, the GSM/UMTS Service Center Address parameter, TP-SCA, is set to indicate the Service Center associated with where this GSM/UMTS message is originating, such as in a mobile device, step 533. The GSM/UMTS Status Response Request parameter, TP-SRR, can be set to a value of False and rely on the CDMA SMS's multiple acknowledgement protocol to provide the feedback that the message was received correctly, step 534. Alternative embodiments of the procedure 510 may insert additional parameters. The value of GSM/UMTS Reply parameter, TP-RP, is set to True or False depending respectively on whether or not User Acknowledgement is requested in the CDMA SMS message, steps 543, 545, 548. The procedure 510 next exits and returns the newly constructed GSM/UMTS SMS host message 400 to the application which called the procedure 510, step 539.

If the Point-to-Point CDMA SMS message was mobile terminated, execution continues with insertion of the GSM/UMTS Message Type Indicator parameter, TP-MTI, into the GSM/UMTS SMS host message, step 541. The TP-MTI's value indicates that the message is a GSM/UMTS Deliver Message. The GSM/UMTS Origination Address parameter, TP-OA, is inserted into the GSM/UMTS SMS host message, where the TP-OA's value is the Origination Address copied from the CDMA SMS message, step 542. The value of the GSM/UMTS Reply parameter, TP-RP, is set to True or False depending respectively on whether or not User Acknowledgement is requested in the CDMA SMS message, steps 543, 545, 548. The procedure 510 then exits and returns the newly constructed GSM/UMTS SMS host message to the application that called the procedure 510, step 539.

The CDMA SMS message 410 processed by the procedure 510 may require various CDMA acknowledgement messages to be generated and/or sent in response to reception of the CDMA SMS message 410. The various CDMA SMS acknowledgement messages may include Transport Layer Acknowledgement, Delivery Acknowledgement, User Acknowledgement, and Read Acknowledgement. The generation and transmission of such acknowledgement messages may be performed outside of the procedure 510, possibly at a low layer in the communication stack. In certain circumstances, such CDMA acknowledgement messages may themselves have to be embedded within a GSM/UMTS SMS host message 400 using the same procedure 510 or a similar procedure, as illustrated in FIG. 5B.

To accomplish this, the type of the CDMA SMS message may be tested to determine if a CDMA SMS acknowledgement message needs to be embedded within a GSM/UMTS SMS host message 400, tests 512, 513. First, the procedure 510 may test whether the CDMA SMS message is of a type that requires a transport layer acknowledgement, test 512. If the CDMA message is a CDMA SMS Transport Layer Acknowledgement Message (i.e., test 512="YES"), further execution determines whether the CDMA SMS Transport Layer Acknowledgement Message is mobile terminated or mobile originated, test 514. If the CDMA SMS Transport Layer Acknowledgement Message is mobile originated, the Message Type TP-MTI field of the GSM/UMTS SMS host message 400 is set to the Deliver Report message type, step 515. Thereafter, the procedure 510 sets the GSM/UMTS SMS Destination Address field, TP-DA, to the Destination Address of the embedded CDMA SMS message, step 532. Then the GSM/UMTS Service Center Address field, TP-SCA, is set to indicate the Service Center associated with where this GSM/UMTS message is originating, step 533. The GSM/UMTS Status Response Request parameter, TP-SRR, can be set to a value of False and rely on the CDMA SMS's multiple acknowledgement protocol to provide the feedback that the message was received correctly, step 534. The value of the GSM/UMTS Reply Parameter, TP-RP, is set to True or False depending respectively on whether or not User Acknowledgement is requested in the CDMA SMS message, steps 543, 545, 548. The procedure 510 then exits and returns the newly constructed GSM/UMTS SMS host message to the application that called the procedure 510, step 539.

If the CDMA SMS Transport Layer Acknowledgement Message is mobile terminated, the Message Type TP-MTI field of the GSM/UMTS SMS host message 400 is set to the Submit Report message type, step 516. Then the GSM/UMTS SMS Origination Address field, TP-OA, is set to the Origination Address of the embedded CDMA SMS message, step 542. The value of the GSM/UMTS Reply parameter, TP-RP, is set to True or False depending respectively on whether or not User Acknowledgement is requested in the CDMA SMS message, steps 543, 545, 548. The procedure 510 then exits and returns the newly constructed GSM/UMTS SMS host message to the application that called the procedure 510, step 539.

If the CDMA SMS message's type was not a Transport Layer Acknowledgement message type (i.e., test 512="NO"), the procedure 510 determines whether the CDMA SMS message's type is a Delivery Acknowledgement type message, step 513. If so, the TP-MTI field of the GSM/UMTS SMS host message 400 is set to the GSM/UTMS Status Report message type, step 517. Thereafter, execution continues by determining the direction of the message, step 518. If the message is mobile-originated, the GSM/UMTS Destination Address parameter, TP-DA, is set with a value equal to the Destination Address in the CDMA SMS message, step 532. Next, the GSM/UMTS Service Center Address parameter, TP-SCA, is set to indicate the Service Center associated with where this GSM/UMTS message is originating, step 533. The GSM/UMTS Status Response Request parameter, TP-SRR, can be set to a value of False and rely on the CDMA SMS's multiple acknowledgement protocol to provide the feedback that the message was received correctly, step 534. The value of the GSM/UMTS Reply parameter, TP-RP, is set to True or False depending respectively on whether or not User Acknowledgement is requested in the CDMA SMS message, steps 543, 545, 548. The procedure 510 next exits and returns the newly constructed GSM/UMTS SMS host message to the application calling the procedure 510, step 539.

If the Transport Layer Acknowledgement SMS message was mobile-terminated, the GSM/UMTS SMS Origination Address field, TP-OA, is set equal to the Origination Address of the embedded CDMA SMS message, step 542. The value of the GSM/UMTS Reply parameter, TP-RP, is set to True or False depending respectively on whether or not User Acknowledgement is requested in the CDMA SMS message, steps 543, 545, 548. The procedure 510 next exits and returns the newly constructed GSM/UMTS SMS host message to the application that called the procedure 510, step 539.

If the procedure 510 determined that the CDMA SMS message's type is not a Transport Layer Acknowledgement message type and is not the Delivery Acknowledgement message type (i.e., tests 512 and 513 both="NO"), the procedure 510 may simply assume that the message type is either the Point-to-Point Deliver or Submit message types by continuing with step 530 as described above. However, an embodiment may continue to check for further CDMA SMS message types, such as a broadcast message or other CDMA SMS acknowledgement message types. If the embodiment does check for another CDMA SMS message type, the embodiment may execute steps similar to the steps executed for other message types. In particular, the procedure 510 may set the TP-MTI field of the GSM/UMTS SMS host message 400 to the most appropriate GSM/UTMS message type which describes the other type of embedded CDMA SMS message. The other various GSM/UMTS SMS fields, such as TP-DA, TP-SCA, TP-SRR, TP-OA, and/or TP-RP may be set the same as for the Transport Layer Acknowledgement Delivery Acknowledgement message types.

Figure 6A:
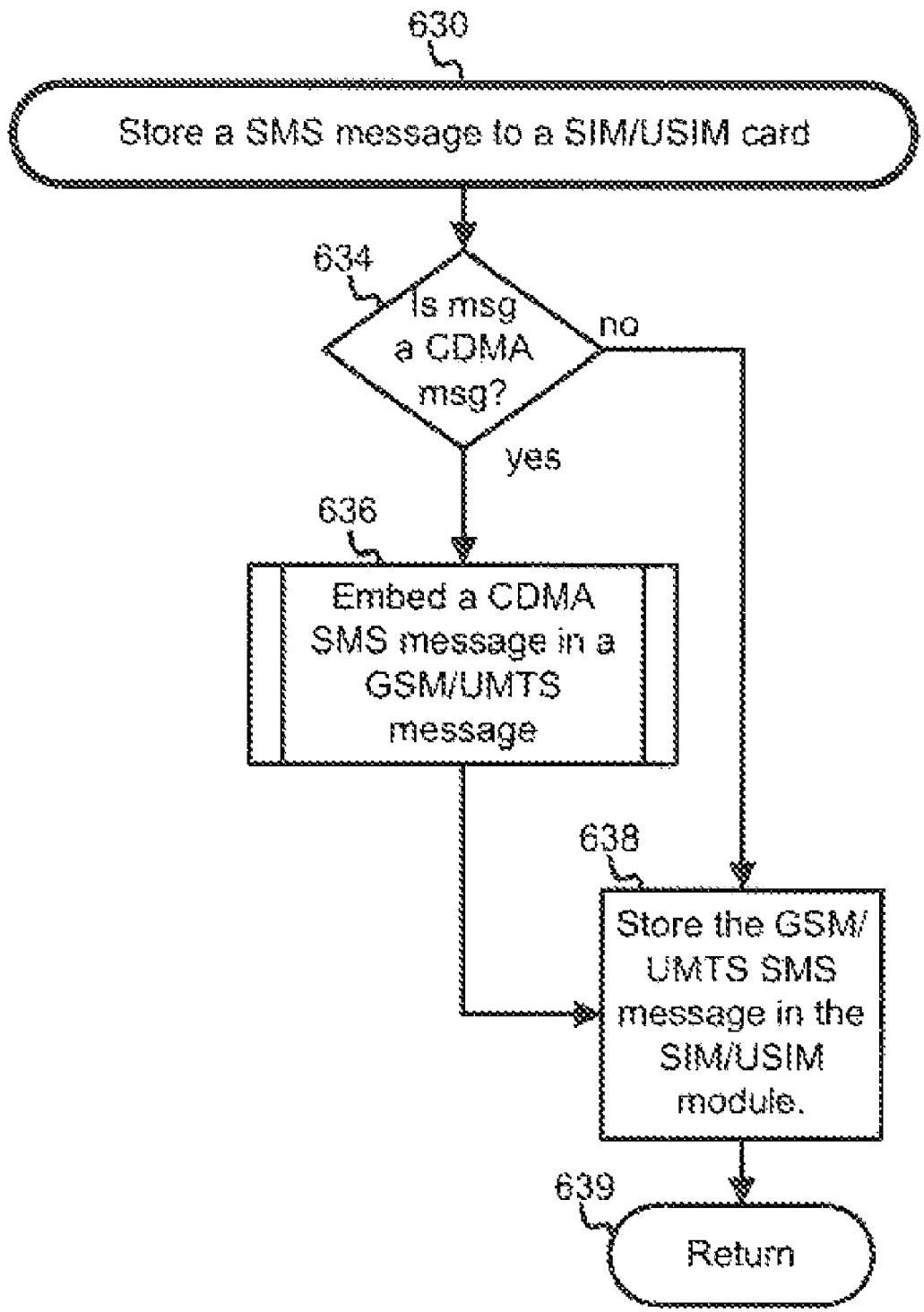
FIGS. 6A and 6B are flowcharts of procedures for storing and reading a SMS message to and from a SIM/USIM memory.

FIG. 6A is a process flowchart of a procedure 630 to store a SMS message to a smart card memory module 104. The same procedure 630 may be used to store a SMS message into other memory 105. The smart card memory module 104 may be in a single-mode GSM/UMTS mobile device 210, in a multimode mobile device 100, or a CDMA mobile device 110 specially adapted to accept and access a smart card memory module 104. An argument to the procedure 630 is a SMS message. The procedure 630 begins by determining whether the argument SMS message is a CDMA SMS message, step 634. If not, the procedure 630 assumes that the argument SMS message is a GSM/UMTS SMS message and proceeds to store (write) the message in the smart card 104, step 638. The argument SMS message may be an ordinary GSM/UMTS SMS message or may be a GSM/UMTS SMS host message 400 with a CDMA SMS message 410 already embedded. If the argument SMS message is a CDMA SMS message 410 (i.e., test 634="YES"), the procedure 630 calls the procedure 510 of the FIG. 5B flowchart to embed the CDMA SMS message 410 in a GSM/UMTS SMS host message 400, step 636. Then execution proceeds to store the newly created GSM/UMTS SMS host message 400 in the smart card memory module 104, step 638. Finally, the procedure 630 returns execution to the application that called the procedure 630, step 639.

Figure 6B:
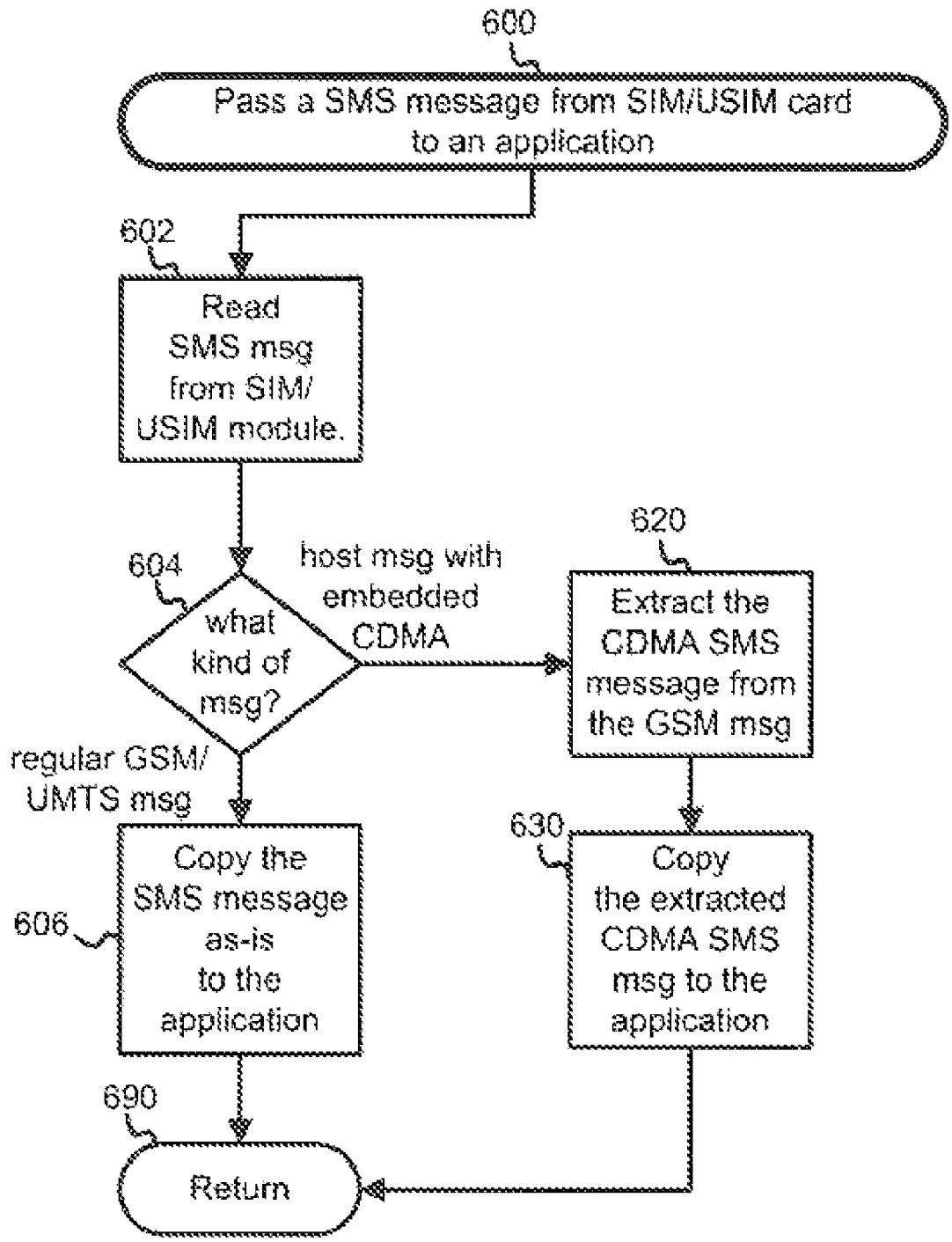

FIG. 6B is a process flowchart of a procedure 600 to retrieve a SMS message from a smart card memory module 104 and return the SMS message to the application that called the procedure 600. An argument to the procedure may be a reference to a GSM/UMTS SMS message such as a memory address in the smart card memory module 104 or some other unique identification of a GSM/UMTS message previously stored in the smart card memory module 104. The copy of the retrieved SMS message eventually returned by the procedure 600 may be a GSM/UMTS SMS host message 400 or may be the embedded CDMA SMS message 410. An embodiment of the procedure 600 may also return an indication of whether the returned SMS message is a CDMA SMS message.

The procedure 600 begins by reading the SMS message in smart card memory module 104 referenced by an argument of the procedure 600, step 602. Because the SMS message is in a smart card memory module 104, the procedure 600 may assume that it is a GSM/UMTS message of some kind. Next, the procedure 600 checks whether the SMS message is a GSM/UMTS SMS host message 400 or an ordinary GSM/UMTS SMS message, step 604. For example, the check may examine the explicit indication bit pattern in the TP-DCS field or TP-PID field, which indicates whether the SMS message is a GSM/UMTS SMS host message. If the SMS message referenced by the argument is not a GSM/UMTS SMS host message 400, the GSM/UMTS message is returned as-is, step 606, and the procedure 600 exits back to that application that called the procedure 600, step 690. If the argument does refer to a GSM/UTMS SMS host message, the procedure 600 extracts the embedded CDMA SMS message 410 from the GSM/UMTS SMS host message 400, step 620. Because the embedded CDMA SMS message 410 is the User Data field TP-UD of the GSM/UMTS SMS host message 400, the procedure 600 may make a straightforward memory copy of the embedded CDMA SMS message 410 located within the GSM/UMTS SMS host message 400. The length of the embedded CDMA SMS message 410 is found in the TP-UDL field which may be used to determine the fields which need to be copied to extract the CDMA SMS message. The SMS message copy is returned to the application that called the procedure 600, step 630, and execution returns to the application that called the procedure 600, step 690. The procedure 600 may also return an indication of whether the returned SMS message copy is a CDMA-formatted message or a GSM/UMTS-formatted message.

An alternative embodiment of the procedure 600 may simply return the address of the SMS message in the smart card memory module 104 instead of explicitly creating and returning a copy of the message. The returned address may simply be the address of the GSM/UMTS SMS message or may be the beginning address of the User Data field, which is the address of the embedded CDMA SMS message within its GSM/UMTS SMS host message. An embodiment may also return the length of the returned, addressed message, so the application can extract the CDMA SMS message from memory using the starting address and the length.

Either the SMS message center 114, 214 or the mobile device 100, 110, 210, or both can perform any required embedding or extraction of a CDMA SMS message 410 in a GSM/UMTS SMS host message 400. That is, a procedure similar to the flowcharts of FIGS. 5A and 5B may be embodied in a message server 114, 214 or in a mobile device 100, 110, 210 or in both. Further, direct interpretation or manipulation of a CDMA SMS message 410 may be performed by either a CDMA SMS message server 114 or a GSM/UMTS SMS message server 214 while the CDMA SMS message 410 is embedded in a GSM/UMTS SMS host message 400. Likewise, the mobile device 100, 110, 210 may directly perform interpretation or local manipulation of a CDMA SMS message 410 while it is stored within a GSM/UMTS SMS host message 400.

The handling of both CDMA SMS messages and GSM SMS messages may be designed to be transparent to the user regardless of the operating mode of the mobile device. When a single-mode GSM/UMTS mobile device 210 or multimode mobile device 100 is operating in GSM/UMTS mode, it can still perform all of the CDMA SMS functions, including:

send a mobile-originated SMS message;
receive a mobile-terminated SMS message;
receive a CDMA Voice Mail Notification;
store or read messages to or from a RUIM card if present;
use other CDMA Card Application Toolkit features like SEND SMS or SMS-PP Download;
use Service Category Programming Teleservice (SCPT) to configure the Broadcast SMS service table over the air; or
do any other normal or special SMS processing.

An embodiment may use the procedures 510, 600, 630 of FIGS. 5A, 5B, 6A, and 6B to perform such functions by automatically embedding, extracting, and processing or directly examining all of a CDMA SMS message 410 within the user data section of a GSM/UMTS SMS host message 400 as may be needed. Any other normal or special CDMA SMS processing may still also be possible even while the mobile device is in GSM/UMTS mode by setting or interpreting the parameters and contents of a CDMA SMS message 410 embedded in a GSM/UMTS SMS host message 400.

Figure 7:
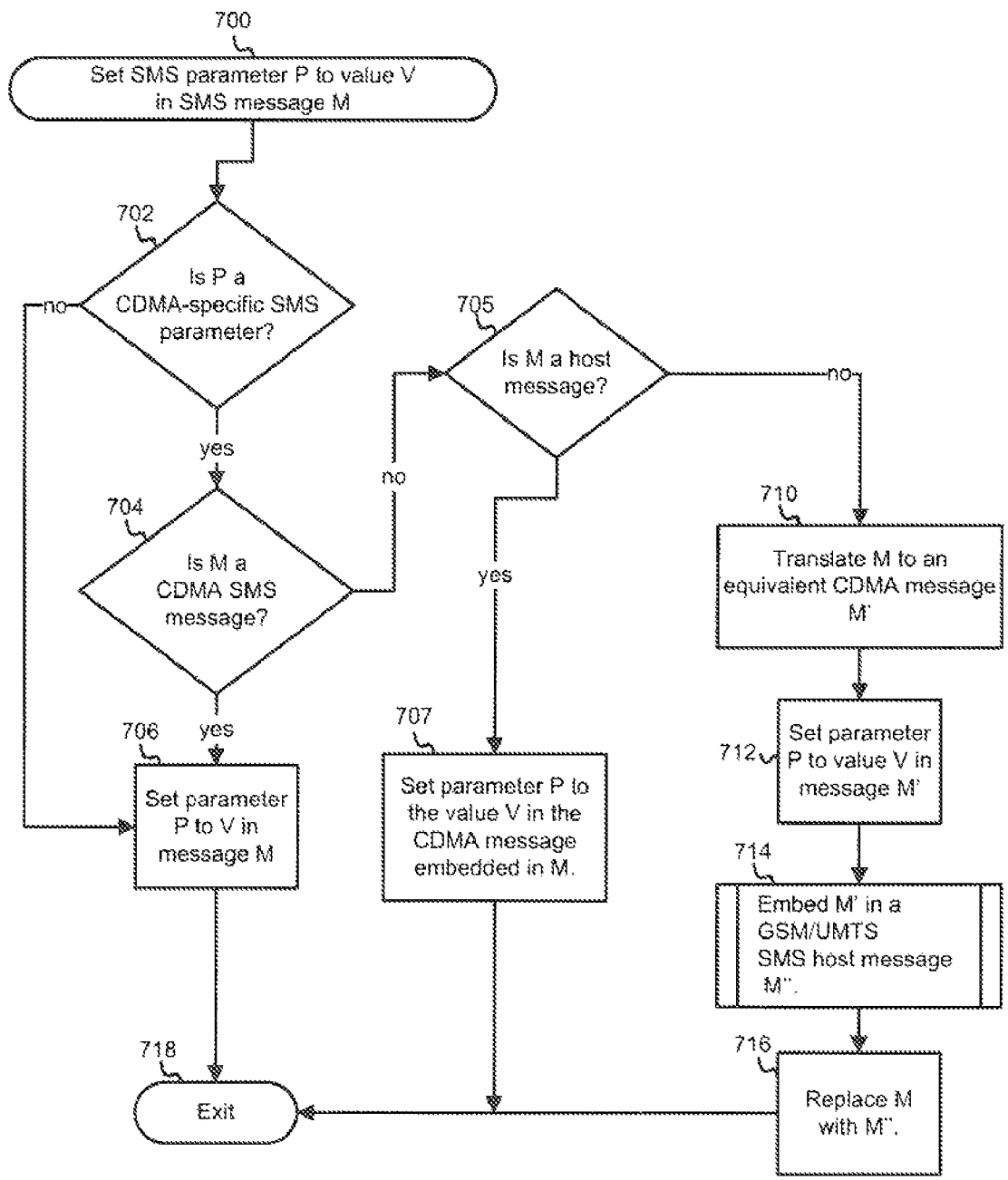
FIG. 7 is a flowchart of a procedure 700 to set an SMS parameter P to a value V in any SMS message.

For example, FIG. 7 is a process flowchart of a procedure 700 to set an SMS parameter P to a value V in any SMS message. The arguments to procedure 700 are the SMS parameter P, its value V, and the SMS message M in which the parameter P is to be set. The SMS parameter P may be any CDMA or GSM/UMTS SMS parameter. The SMS message M may be any kind of SMS message, such as a CDMA SMS message, a GSM SMS message, a UMTS SMS message, or any other kind of SMS message. First, the procedure 700 tests whether the SMS parameter P is a CDMA SMS parameter which has no counterpart in GSM/UMTS—that is a CDMA-specific parameter, step 702. If the SMS parameter P is not CDMA-specific, then it is a parameter which can be set in a non-CDMA SMS message, so execution continues by simply setting that parameter P in the SMS message, step 706. Execution then returns to the application that called the process 700, step 718.

If the SMS parameter P is CDMA-specific, further execution determines whether the SMS message M is a CDMA SMS message, step 704. If the SMS message M is a CDMA SMS message, further execution sets SMS parameter P to value V in the SMS message M, step 706. That is, the CDMA-specific SMS parameter P may be set in the SMS message M, because M is a CDMA SMS message. Then, execution returns to the application which called the procedure 700, step 718.

If P is a CDMA-specific SMS parameter, but the SMS message M is not a CDMA SMS message (i.e., step 704="NO"), then the procedure 700 determines whether the SMS message M is a non-CDMA SMS host message, step 705. If so—that is, the SMS message M already has a CDMA SMS message embedded in it—then parameter P may be set to the value V in the CDMA message embedded in SMS message M, step 707, before execution returns to the application which called the procedure 700, step 718.

If parameter P is CDMA-specific and if the SMS message M was determined not to be a CDMA SMS message but not a non-CDMA SMS host message (i.e., step 705="NO"), the procedure 700 translates the non-CDMA SMS message M to an equivalent CDMA SMS message M', step 710. This translation is possible because Point-to-Point CDMA SMS messages can be translated to non-CDMA SMS messages (GSM/UMTS SMS messages) without loss of parameter or user data. Because M' is a CDMA SMS message 410, the SMS parameter P may be set to the value V in M', step 712. Next, CDMA SMS message M' 410, may be embedded in a non-CDMA SMS host message M", such as a GSM/UMTS SMS host message 400, step 714. Then the SMS message M is replaced with the SMS message M", step 716. The SMS message M is now a non-CDMA SMS host message, such as a GMS/UMTS SMS host message 400. The embedded CDMA SMS message M' contains the SMS parameter P with the value V. Finally, execution returns to the application that called the procedure 700, step 718. The application calling the procedure 700 may ignore whether the SMS message is a CDMA SMS message or a GSM/UMTS SMS message. In any case, the final SMS message produced does contain the SMS parameter P with the value V. The procedure 700 may be called repeatedly to set the values V of multiple SMS parameters P of a message M.

An embodiment may offer a software Application Programming Interface (API) which operates on all SMS messages regardless of the kind of message and regardless of the operational mode of the mobile device. The operational modes may include CDMA, GSM, or UMTS. The message types handled by the API may include:

a regular CDMA SMS message;

a regular GSM/UMTS SMS message;

a GSM/UMTS SMS host message 400 or a CDMA SMS message 410 embedded in a GSM/UMTS SMS host message 400.

In particular, GSM/UMTS mobile devices or multimode mobile devices operating in GSM/UMTS mode may be provided with an API that can be called by application software which transparently operates with all kinds of SMS messages. The API can perform—and hide from the application—the details of automatically extracting a CDMA SMS message 410 from a GSM/UMTS SMS host message as needed or automatically embedding a CDMA SMS message 410 within a GSM/UMTS SMS host message as needed. The API may call procedures like the procedures 501, 510, 600, 630, 700 of FIGS. 5A through 7, in order to automate, encapsulate, and "hide" the differences between CDMA and GSM/UMTS message features. That is, the API may provide all normal operations for handling CDMA SMS messages and provide all the same operations for GSM/UMTS SMS host messages-perhaps invisibly to the application software using the API. The normal operations may include receiving, forwarding, composing, storing, reading, and sending SMS messages, which may include parameters which are specific to the CDMA SMS message format.

An embodiment may reverse the embedding roles of the CDMA and GSM/UMTS messages. That is, a normal GSM/UMTS SMS message can also be embedded in a CDMA SMS host message. Embedding a GSM/UMTS SMS message in a CDMA SMS host message may be useful in certain situations. For example, a CDMA mobile device 110 may store the CDMA SMS host message on a CDMA RUIM or CSIM memory module and later retrieve and extract the embedded GSM message as-is without any need for translation.

The hardware used to implement the forgoing embodiments may be processing elements and memory elements configured to execute a set of instructions, wherein the set of instructions are for performing method steps corresponding to the above methods. Alternatively, some steps or methods may be performed by circuitry that is specific to a given function.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. The software module may reside in a processor readable storage medium and/or processor readable memory both of which may be any of RAM memory, flash memory, ROM memory, EPROM memory, EEPROM memory, registers, hard disk, a removable disk, a CD-ROM, or any other tangible form of data storage medium known in the art. Moreover, the processor readable memory may comprise more than one memory chip, memory internal to the processor chip, in separate memory chips, and combinations of different types of memory such as flash memory and RAM memory. References herein to the memory of a handset are intended to encompass any one or all memory modules within the handset without limitation to a particular configuration, type or packaging. An exemplary storage medium is coupled to a processor in either the mobile handset or the theme server such that the processor can read information from, and write information to, the storage medium. In the alternative, the storage medium may be integral to the processor. The processor and the storage medium may reside in an ASIC.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

I claim:

1. A method for preserving CDMA (code division multiple access) SMS (short message service) message parameters in a non-CDMA mobile device, comprising:

embedding a CDMA SMS message in a non-CDMA SMS host message; and setting a first message parameter of the non-CDMA SMS host message based on the embedded CDMA SMS message, wherein embedding the CDMA SMS message in the non-CDMA SMS host message comprises:
creating an uninitialized non-CDMA SMS host message;
reserving fields in the uninitialized non-CDMA SMS host message for common SMS parameters;
initializing the common SMS parameters with default values; and
copying the CDMA SMS message into a user data field of the non-CDMA SMS host message.

2. The method of claim 1, wherein the non-CDMA SMS host message is a GSM SMS message.

3. The method of claim 1, wherein the non-CDMA SMS host message is a UMTS SMS message.

4. The method of claim 1, further comprising:
reading the CDMA SMS message while the CDMA SMS message is embedded within the non-CDMA SMS host message; and
processing the CDMA SMS message while the CDMA SMS message is embedded within the non-CDMA SMS host message.

5. The method of claim 1, further comprising setting a second parameter of the non-CDMA SMS host message which indicates that the non-CDMA SMS host message contains a CDMA SMS message.

6. The method of claim 1, further comprising:
providing a mapping between a first parameter of the embedded CDMA SMS message and the first parameter of the non-CDMA-SMS host message.

7. The method of claim 1, further comprising storing the non-CDMA SMS host message in a removable memory module.

8. The method of claim 7, further comprising:
reading the non-CDMA SMS host message stored in the removable memory module; and
extracting the embedded CDMA SMS message from the non-CDMA SMS host message.

9. The method of claim 7, wherein the removable memory module is a SIM memory module.

10. The method of claim 7, wherein the removable memory module is a USIM memory module.

11. The method of claim 7, wherein the removable memory module is a R-UIM memory module.

12. The method of claim 8, wherein the non-CDMA SMS message is a GSM SMS message.

13. The method of claim 8, wherein the non-CDMA SMS message is a UMTS SMS message.

14. The method of claim 1, wherein embedding the CDMA SMS message in a non-CDMA SMS host message further comprises:
determining whether a length of the CDMA SMS message exceeds a size limit of the user data field in the non-CDMA SMS host message;
embedding a first portion of the CDMA SMS message in a first non-CDMA SMS host message and embedding a remainder portion of the CDMA SMS message in a second non-CDMA SMS host message if it is determining that the length of the CDMA SMS message exceeds the size limit; and
inserting a symbol in the first non-CDMA SMS host message and the second non-CDMA SMS host message to indicate that a single long CDMA SMS message is embedded.

15. The method of claim 8, wherein extracting the embedded CDMA SMS message from the non-CDMA SMS host message comprises:

determining based on a parameter in the non-CDMA SMS host message the length and location of the embedded CDMA SMS message; and
creating a memory copy of the embedded CDMA SMS message from the non-CDMA SMS host message stored in the removable memory module.

16. A non-CDMA (code division multiple access) mobile device comprising:
a processor; and
a memory unit coupled to the processor, wherein the memory contains processor readable software instructions configured to cause the processor to perform operations comprising:
embedding a CDMA SMS message in a non-CDMA SMS (short message service) host message; and
setting a first message parameter of the non-CDMA SMS host message based on the embedded CDMA SMS message,
wherein embedding the CDMA SMS message in the non-CDMA SMS host message comprises:
creating an uninitialized non-CDMA SMS host message;
reserving fields in the uninitialized non-CDMA SMS host message for common SMS parameters;
initializing the common SMS parameters with default values; and
copying the CDMA SMS message into a user data field of the non-CDMA SMS host message.

17. The non-CDMA mobile device of claim 16, wherein the non-CDMA mobile device is a GSM mobile device.

18. The non-CDMA mobile device of claim 16, wherein the non-CDMA mobile device is a UMTS mobile device.

19. The non-CDMA mobile device of claim 16, further wherein the memory contains processor readable software instructions configured to cause the processor to:
read the CDMA SMS message while the CDMA SMS message is embedded within the non-CDMA SMS host message; and
process the CDMA SMS message while the CDMA SMS message is embedded within the non-CDMA SMS host message.

20. The non-CDMA mobile device of claim 16, wherein the memory contains processor readable software instructions configured to cause the processor to set a second parameter of the non-CDMA SMS host message which indicates that the non-CDMA SMS host message contains a CDMA SMS message.

21. The non-CDMA mobile device of claim 16, wherein the memory contains processor readable software instructions configured to cause the processor to provide a mapping between a first parameter of the embedded CDMA SMS message and the first parameter of the non-CDMA-SMS host message.

22. The non-CDMA mobile device of claim 16, further comprising a removable memory module, wherein the processor executable software instructions stored on the memory are further configured to cause the processor to store the CDMA SMS message embedded in a non-CDMA SMS host message on the removable memory module.

23. The non-CDMA mobile device of claim 22, wherein the removable memory module is a SIM memory module.

24. The non-CDMA mobile device of claim 22, wherein the removable memory module is a USIM memory module.

25. The non-CDMA mobile device of claim 20, wherein the removable memory module is a R-UIM memory module.

26. The non-CDMA mobile device of claim 16, wherein the memory further contains processor readable software instructions configured to cause the processor to:

read the non-CDMA SMS host message stored in the removable memory module; and
extract the embedded CDMA SMS message from the non-CDMA SMS host message.

27. A non-CDMA (code division multiple access) mobile device comprising means for embedding a CDMA SMS (short message service) message in a non-CDMA SMS host message; and
means for setting a first message parameter of the non-CDMA SMS host message based on the embedded CDMA SMS message,
wherein means for embedding the CDMA SMS message in the non-CDMA SMS host message comprises:
means for creating an uninitialized non-CDMA SMS host message;
means for reserving fields in the uninitialized non-CDMA SMS host message for common SMS parameters;
means for initializing the common SMS parameters with default values; and means for copying the CDMA SMS message into a user data field of the non-CDMA SMS host message.

28. The non-CDMA mobile device of claim 27, wherein the non-CDMA mobile device is a GSM mobile device.

29. The non-CDMA mobile device of claim 27, wherein the non-CDMA mobile device is a UMTS mobile device.

30. The non-CDMA mobile device of claim 27, further comprising:
means for reading the CDMA SMS message while the CDMA SMS message is embedded within the non-CDMA SMS host message; and
means for processing the CDMA SMS message while the CDMA SMS message is embedded within the non-CDMA SMS host message.

31. The non-CDMA mobile device of claim 27, further comprising, further comprising means for setting a second parameter of the non-CDMA SMS host message which indicates that the non-CDMA SMS host message contains a CDMA SMS message.

32. The non-CDMA mobile device of claim 27, further comprising:
means for mapping between a first parameter of the embedded CDMA SMS message and the first parameter of the non-CDMA-SMS host message.

33. The non-CDMA mobile device of claim 27, further comprising means for removably storing the non-CDMA SMS host message.

34. The non-CDMA mobile device of claim 33, further comprising:
means for reading the non-CDMA SMS host message stored in the means for removably storing the non-CDMA SMS host message; and
means for extracting the embedded CDMA SMS message from the non-CDMA SMS host message.

35. The non-CDMA mobile device of claim 33, wherein the means for removably storing the non-CDMA SMS host message is a SIM memory module.

36. The non-CDMA mobile device of claim 33, wherein the means for removably storing the non-CDMA SMS host message is a USIM memory module.

37. The non-CDMA mobile device of claim 33, wherein the means for removably storing the non-CDMA SMS host message is a R-UIM memory module.

38. The non-CDMA mobile device of claim 34, wherein the non-CDMA SMS message is a GSM SMS message.

39. The non-CDMA mobile device of claim 34, wherein the non-CDMA SMS message is a UMTS SMS message.

40. The non-CDMA mobile device of claim 34, wherein means for extracting the embedded CDMA SMS message from the non-CDMA SMS host message comprises:
means for determining based on parameter in the non-CDMA SMS host message the length and location of the embedded CDMA SMS message; and
means for creating a memory copy of the embedded CDMA SMS message from the non-CDMA SMS host message stored in the removable memory module.

41. The non-CDMA mobile device of claim 27, wherein means for embedding the CDMA SMS message in a non-CDMA SMS host message further comprises:
means for determining whether the length of the CDMA SMS message exceeds a size limit of the user data field in the non-CDMA SMS host message;
means for embedding a first portion of the CDMA SMS message in a first non-CDMA SMS host message and embedding a remainder portion of the CDMA SMS message in a second non-CDMA SMS host message if it is determining that the length of the CDMA SMS message exceeds the size limit; and
means for inserting a symbol in the first non-CDMA SMS host message and the second non-CDMA SMS host message to indicate that a single long CDMA SMS message is embedded.

42. A SMS (short message service) message server capable of receiving SMS messages originating from a CDMA (code division multiple access) mobile device comprising:
a processor; and
a memory unit coupled to the processor, wherein the memory contains processor readable software instructions configured to cause the processor to perform operations comprising:
receiving a CDMA SMS message destined for a non-CDMA mobile device;
embedding the received CDMA SMS message in a non-CDMA SMS host message;
setting a first message parameter of the non-CDMA SMS host message based on the embedded CDMA SMS message; and
transmitting the CDMA SMS message embedded in a non-CDMA SMS host message to the non-CDMA mobile device,
wherein embedding the received CDMA SMS message in the non-CDMA host message comprises:
creating an uninitialized non-CDMA SMS host message;
reserving fields in the uninitialized non-CDMA SMS host message for common SMS parameters;
initializing the common SMS parameters with default values; and
copying the received CDMA SMS message into a user data field of the non-CDMA SMS host message.

43. The SMS message server of claim 42, wherein the SMS message server is a GSM SMS message server.

44. The SMS message server of claim 42, wherein the SMS message server is a UMTS mobile device.

45. The SMS message server of claim 42, wherein the memory contains processor readable software instructions configured to cause the processor to set a second parameter of the non-CDMA SMS host message which indicates that the non-CDMA SMS host message contains a CDMA SMS message.

46. The SMS message server of claim 42, wherein the memory contains processor readable software instructions configured to cause the processor to provide a mapping between a first parameter of the embedded CDMA SMS message and the first parameter of the non-CDMA-SMS host message.

47. The SMS message server of claim 42, further wherein the memory further contains processor readable software instructions configured to cause the processor to:
   extract the embedded CDMA SMS message from the non-CDMA SMS host message; and
   transmit the extracted CDMA SMS message as a non-CDMA SMS message to the non-CDMA mobile device.

48. A method of setting a (code division multiple access) CDMA-specific SMS (short message service) message parameter in a non-CDMA SMS message comprising:
   translating the non-CDMA SMS message to an equivalent CDMA SMS message;
   setting the CDMA-specific SMS message parameter in the equivalent CDMA SMS message;
   embedding the equivalent CDMA SMS message in a non-CDMA SMS host message; and
   replacing the non-CDMA SMS message with parameter of the non-CDMA SMS host message.

49. The method of claim 48, wherein the non-CDMA SMS message is a GSM SMS message, and wherein the non-CDMA SMS host message is a GSM SMS host message.

50. The method of claim 48, wherein the non-CDMA SMS message is a UMTS SMS message, and wherein the non-CDMA SMS host message is a UMTS SMS host message.

51. A method of processing a received SMS (short message service) message comprising:
   translating the received SMS message to an equivalent CDMA (code division multiple access) SMS message if the received SMS message is not a CDMA SMS message;
   performing a CDMA operation on the equivalent CDMA SMS message; and
   embedding the equivalent CDMA SMS message in a non-CDMA SMS host message,
   wherein embedding the equivalent CDMA SMS comprises:
   creating an uninitialized non-CDMA SMS host message;
   reserving fields in the uninitialized non-CDMA SMS host message for common SMS parameters;
   initializing the common SMS parameters with default values; and
   copying the equivalent CDMA SMS message into a user data field of the non-CDMA SMS host message.

52. A non-transitory tangible storage medium having stored thereon processor executable instructions configured to cause a processor to perform operations for preserving CDMA (code division multiple access) SMS (short message service) message parameters in a non-CDMA mobile device comprising:
embedding a CDMA SMS message in a non-CDMA SMS host message; and
   setting a first message parameter of the non-CDMA SMS host message based on the embedded CDMA SMS message,
   wherein embedding the CDMA SMS message in the non-CDMA SMS host message comprises:
   creating an uninitialized non-CDMA SMS host message;
   reserving fields in the uninitialized non-CDMA SMS host message for common SMS parameters;
initializing the common SMS parameters with default values; and
copying the CDMA SMS message into a user data field of the non-CDMA SMS host message.

53. The non-transitory tangible storage medium of claim 52, wherein the non-CDMA SMS host message is a GSM SMS message.

54. The non-transitory tangible storage medium of claim 52, wherein the non-CDMA SMS host message is a UMTS SMS message.

55. The non-transitory tangible storage medium of claim 52, wherein the stored processor executable instructions are configured to cause a processor to perform operations further comprising:
   reading the CDMA SMS message while the CDMA SMS message is embedded within the non-CDMA SMS host message; and
   processing the CDMA SMS message while the CDMA SMS message is embedded within the non-CDMA SMS host message.

56. The non-transitory tangible storage medium of claim 52, wherein the stored processor executable instructions are configured to cause a processor to perform operations further comprising:
   setting a second parameter of the non-CDMA SMS host message which indicates that the non-CDMA SMS host message contains a CDMA SMS message.

57. The non-transitory tangible storage medium of claim 52, wherein the stored processor executable instructions are configured to cause a processor to perform operations further comprising:
   providing a mapping between a first parameter of the embedded CDMA SMS message and the first parameter of the non-CDMA-SMS host message.

58. The non-transitory tangible storage medium of claim 52, wherein the stored processor executable instructions are configured to cause a processor to perform operations further comprising:
   storing the non-CDMA SMS host message in a removable memory module.

59. The non-transitory tangible storage medium of claim 58, wherein the stored processor executable instructions are configured to cause a processor to perform operations further comprising:
   reading the non-CDMA SMS host message stored in the removable memory module; and
   extracting the embedded CDMA SMS message from the non-CDMA SMS host message.

60. The non-transitory tangible storage medium of claim 59, wherein the stored processor executable instructions are configured to cause a processor to perform operations further comprising:
   determining based on parameter in the non-CDMA SMS host message the length and location of the embedded CDMA SMS message;
   creating a memory copy of the embedded CDMA SMS message from the non-CDMA SMS host message stored in the removable memory module.

61. The non-transitory tangible storage medium of claim 52, wherein the stored processor executable instructions are configured to cause a processor to perform operations further comprising:
   determining whether a length of the CDMA SMS message exceeds a size limit of the user data field in the non-CDMA SMS host message;
   embedding a first portion of the CDMA SMS message in a first non-CDMA SMS host message and embedding a remainder portion of the CDMA SMS message in a second non-CDMA SMS host message if it is determining that the length of the CDMA SMS message exceeds the size limit; and inserting a symbol in the first non-CDMA SMS host message and the second non-CDMA SMS host message to indicate that a single long CDMA SMS message is embedded.

62. A non-transitory tangible storage medium having stored thereon processor executable instructions configured to cause a processor to perform operations for setting CDMA (code division multiple access)-specific SMS (short message service) message parameter in a non-CDMA SMS message comprising:
translating the non-CDMA SMS message to an equivalent CDMA SMS message;
setting the CDMA-specific SMS message parameter in the equivalent CDMA SMS message;
embedding the equivalent CDMA SMS message in a non-CDMA SMS host message; and
replacing the non-CDMA SMS message with parameter of the non-CDMA SMS host message.

63. The non-transitory tangible storage medium of claim 62, wherein the non-CDMA SMS message is a GSM SMS message, and wherein the non-CDMA SMS host message is a GSM SMS host message.

64. The non-transitory tangible storage medium of claim 63, wherein the non-CDMA SMS message is a UMTS SMS message, and wherein the non-CDMA SMS host message is a UMTS SMS host message.

65. A non-transitory tangible storage medium having stored thereon processor executable instructions configured to cause a processor to perform operations for processing a received SMS (short message service) message, comprising:
translating the received SMS message to an equivalent CDMA SMS message if the received SMS message is not a CDMA SMS message;
performing a CDMA operation on the equivalent CDMA SMS message; and
embedding the equivalent CDMA SMS message in a non-CDMA SMS host message,
wherein embedding the equivalent CDMA SMS message comprises: creating an uninitialized non-CDMA SMS host message;
reserving fields in the uninitialized non-CDMA SMS host message for common SMS parameters;
initializing the common SMS parameters with default values; and
copying the equivalent CDMA SMS message into a user data field of the non-CDMA SMS host message.

66. A mobile device comprising means for translating a non-CDMA (code division multiple access) SMS (short message service) message to an equivalent CDMA SMS message;
means for setting a CDMA-specific SMS message parameter in the equivalent CDMA SMS message;
means for embedding the equivalent CDMA SMS message in a non-CDMA SMS host message; and
means for replacing the non-CDMA SMS message with the non-CDMA SMS host message.

67. The mobile device of claim 66, wherein the non-CDMA SMS message is a GSM SMS message, and wherein the non-CDMA SMS host message is a GSM SMS host message.

68. The mobile device of claim 66, wherein the non-CDMA SMS message is a UMTS SMS message, and wherein the non-CDMA SMS host message is a UMTS SMS host message.

69. A mobile device, comprising:
means for translating a received SMS (short message service) message to an equivalent CDMA (code division multiple access) SMS message if the received SMS message is not a CDMA SMS message;
means for performing a CDMA operation on the equivalent CDMA SMS message; and
means for embedding the equivalent CDMA SMS message in a non-CDMA SMS host message,
wherein means for embedding the equivalent CDMA SMS message comprises:
means for creating an uninitialized non-CDMA SMS host message;
means for reserving fields in the uninitialized non-CDMA SMS host message for common SMS parameters;
means for initializing the common SMS parameters with default values; and
means for copying the equivalent CDMA SMS message into a user data field of the non-CDMA SMS host message.

* * * * *